(12) United States Patent
Mackey

(10) Patent No.: US 7,737,953 B2
(45) Date of Patent: Jun. 15, 2010

(54) CAPACITIVE SENSING APPARATUS HAVING VARYING DEPTH SENSING ELEMENTS

(75) Inventor: Bob Lee Mackey, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 1231 days.

(21) Appl. No.: 10/922,574

(22) Filed: Aug. 19, 2004

(65) Prior Publication Data

US 2006/0038791 A1 Feb. 23, 2006

(51) Int. Cl.
*G06F 3/041* (2006.01)
(52) U.S. Cl. .................................. 345/173; 178/18.06
(58) Field of Classification Search ................. 345/173, 345/174, 177, 178; 178/18.01, 18.06, 18.03
See application file for complete search history.

(56) References Cited

U.S. PATENT DOCUMENTS

| | | | |
|---|---|---|---|
| 4,087,625 A | 5/1978 | Dym et al. | |
| 4,659,874 A | 4/1987 | Landmeier | |
| 5,304,937 A | 4/1994 | Meyer | |
| 5,374,787 A | 12/1994 | Miller et al. | |
| 5,394,096 A | 2/1995 | Meyer | |
| 5,495,077 A | 2/1996 | Miller et al. | |
| 5,543,590 A | 8/1996 | Gillespie et al. | |
| 5,543,591 A | 8/1996 | Gillespie et al. | |
| 5,648,642 A | 7/1997 | Miller et al. | |
| 5,650,597 A * | 7/1997 | Redmayne | 178/18.06 |
| 5,841,078 A | 11/1998 | Miller et al. | |
| 5,880,411 A | 3/1999 | Gillespie et al. | |
| 5,914,465 A | 6/1999 | Allen et al. | |
| 5,920,310 A | 7/1999 | Faggin et al. | |
| 6,002,389 A * | 12/1999 | Kasser | 345/173 |
| 6,028,271 A | 2/2000 | Gillespie et al. | |
| 6,188,391 B1 | 2/2001 | Seely et al. | |
| 6,239,389 B1 | 5/2001 | Allen et al. | |
| 6,297,811 B1 | 10/2001 | Kent et al. | |
| 6,380,931 B1 | 4/2002 | Gillespie et al. | |
| 6,414,671 B1 | 7/2002 | Gillespie et al. | |
| 6,489,899 B1 | 12/2002 | Ely et al. | |

(Continued)

FOREIGN PATENT DOCUMENTS

WO WO 2004/053782 6/2004

OTHER PUBLICATIONS

Baxter, Larry K. (1997) Captive Sensors: Design and Applications; IEEE Press Series ISBN 0-7803-5351-x.

*Primary Examiner*—Amr Awad
*Assistant Examiner*—Yong Sim

(57) ABSTRACT

One embodiment in accordance with the invention includes a capacitive sensor apparatus that includes a first sensing element having substantially constant width along its length and configured to have varying capacitive coupling to an object proximate to a capacitive sensing reference surface, along a first axis of the capacitive sensing reference surface. The length of the first sensing element is oriented along the first axis. The capacitive sensor apparatus can include a second sensing element having substantially constant width along its length and configured to have varying capacitive coupling to the object proximate to the capacitive sensing reference surface along the first axis. The length of the second sensing element is oriented along the first axis. The first and second sensing elements are conductive, and are configured to provide information corresponding to a spatial location of the object relative to the first axis of the capacitive sensing reference surface.

23 Claims, 17 Drawing Sheets

U.S. PATENT DOCUMENTS

| | | |
|---|---|---|
| 6,610,936 B2 | 8/2003 | Gillespie et al. |
| 6,667,740 B2 | 12/2003 | Ely et al. |
| 7,321,361 B2 * | 1/2008 | Sato et al. .................. 345/173 |
| 7,443,385 B2 * | 10/2008 | Eastty et al. ................. 345/173 |
| 2003/0234771 A1 | 12/2003 | Mulligan et al. |
| 2004/0252109 A1 * | 12/2004 | Trent et al. .................. 345/174 |

* cited by examiner

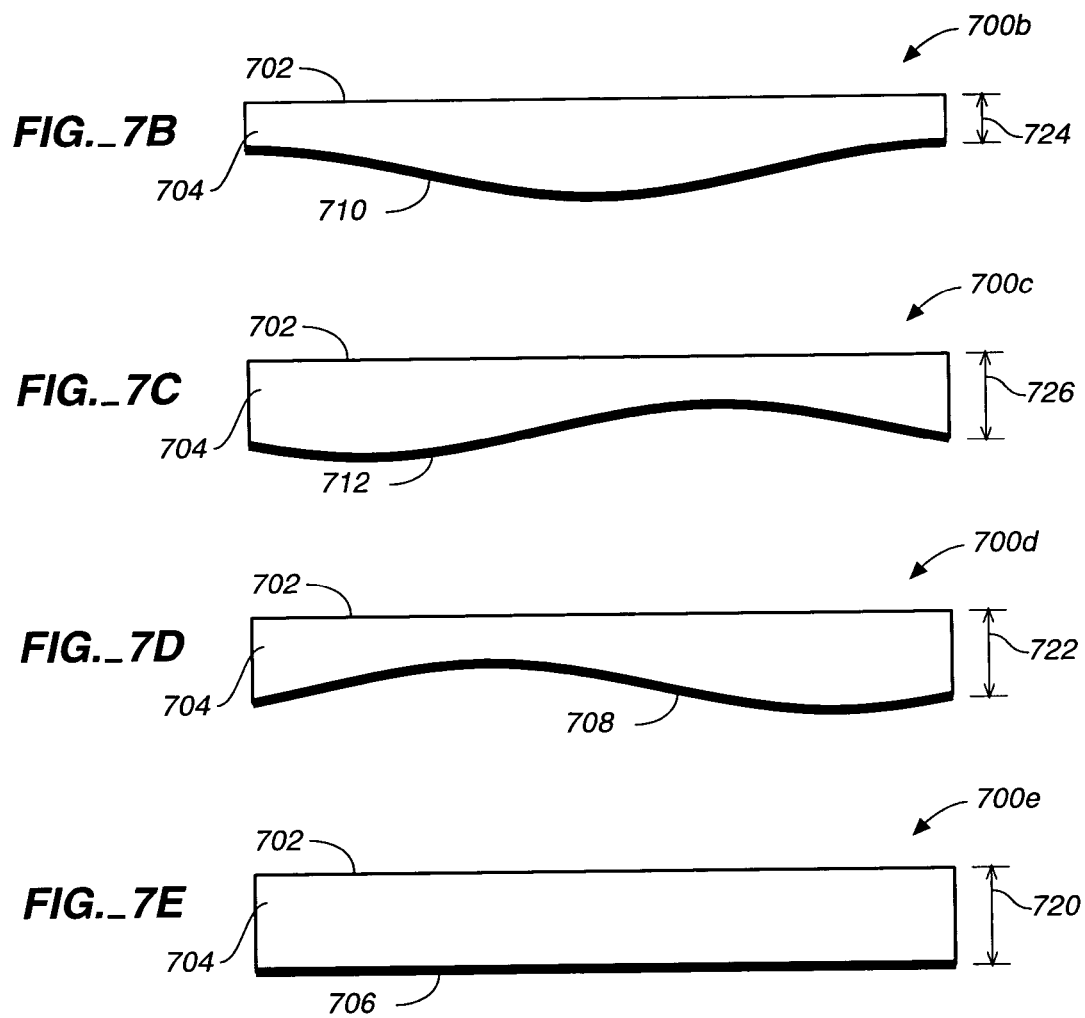

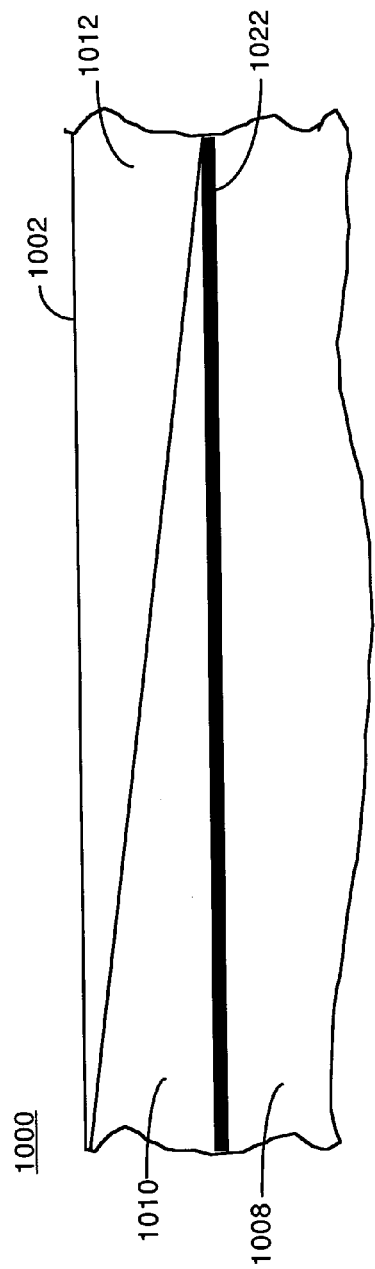
Fig. 10A
Fig. 10B

CAPACITIVE SENSING APPARATUS HAVING VARYING DEPTH SENSING ELEMENTS

BACKGROUND

Conventional computing devices provide several ways for enabling a user to input a choice or a selection. For example, a user can use one or more keys of an alphanumeric keyboard communicatively connected to the computing device in order to indicate a choice or selection. Additionally, a user can use a cursor control device communicatively connected to the computing device to indicate a choice. Also, a user can use a microphone communicatively connected to the computing device to audibly indicate a particular selection. Moreover, touch-sensing technology can be used to provide an input selection to a computing device or other electronic device.

Within the broad category of touch sensing technology there exist capacitive sensing touch screens and touch pads. Among commercially available capacitive sensing touch pads, there are varying patterns of sensing elements. Typical of these sensing elements are traces formed in two layers, one layer running in an x-direction and the other layer running in a y-direction. The location of a finger or other object in relation to the capacitive sensing device is determined from the x-y trace signals. However, there are disadvantages associated with this two-layer formation of x and y patterns of traces. For instance, one of the disadvantages is that the x and y patterns typically require that the x-traces and the y-traces intersect without touching. Thus, the manufacturing process becomes more complicated in order to maintain separation of traces while striving to maintain a small form factor. A further complication in the manufacture of a touch pad having two layers of traces is that of alignment of the two sets of traces.

Another commercially available sensing technology exists in which a single layer of traces is used in which each trace is connected to an area on the touch pad and then the areas are enumerated. However, there are also disadvantages associated with this commercially available sensing technology. For example, one of the disadvantages is that there is no redundancy in the sensing information, which leads to a substantial vulnerability to noise.

One other conventional sensing technology involves the use of sensing electrodes formed in triangular shapes wherein the direction of each triangle point alternates. However, there are disadvantages associated with this technique. For instance, one of the disadvantages is that as a finger (or object) moves towards the wide end of a first triangular shaped electrode and the narrow point of a second triangular shaped electrode, the narrow point electrode does not provide a quality signal because of its inherent signal to noise ratio. As such, this can be referred to as sensing geometry that induces signal to noise ratio concerns.

The present invention may address one or more of the above issues.

SUMMARY

One embodiment in accordance with the invention can include a capacitive sensor apparatus that includes a first sensing element having substantially constant width along its length and configured to have varying capacitive coupling to an object proximate to a capacitive sensing reference surface, along a first axis of the capacitive sensing reference surface. The length of the first sensing element can be oriented along the first axis. The capacitive sensor apparatus can include a second sensing element having substantially constant width along its length and configured to have varying capacitive coupling to the object proximate to the capacitive sensing reference surface along the first axis. The length of the second sensing element can be oriented along the first axis. The first and second sensing elements are conductive, and are configured to provide information corresponding to a spatial location of the object relative to the first axis of the capacitive sensing reference surface.

BRIEF DESCRIPTION OF THE DRAWINGS

FIGS. 3A, 3B, 3C, 3D, and 3E are general cross sectional views in accordance with embodiments of the invention of the capacitive sensor pattern of FIG. 3.

FIGS. 4A, 4B, 4C, 4D, 4E, 4F, and 4G are general cross sectional views in accordance with embodiments of the invention of the capacitive sensor pattern of FIG. 4.

FIGS. 5A, 5B, 5C, 5D, and 5E are general cross sectional views in accordance with embodiments of the invention of the capacitive sensor pattern of FIG. 5.

FIGS. 7B, 7C, 7D, and 7E are lengthwise side sectional views in accordance with embodiments of the invention of the capacitive sensor pattern of FIG. 7A.

FIGS. 10A and 10B are side sectional views of an exemplary capacitive sensor pattern in accordance with embodiments of the invention.

The drawings referred to in this description should not be understood as being drawn to scale unless specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
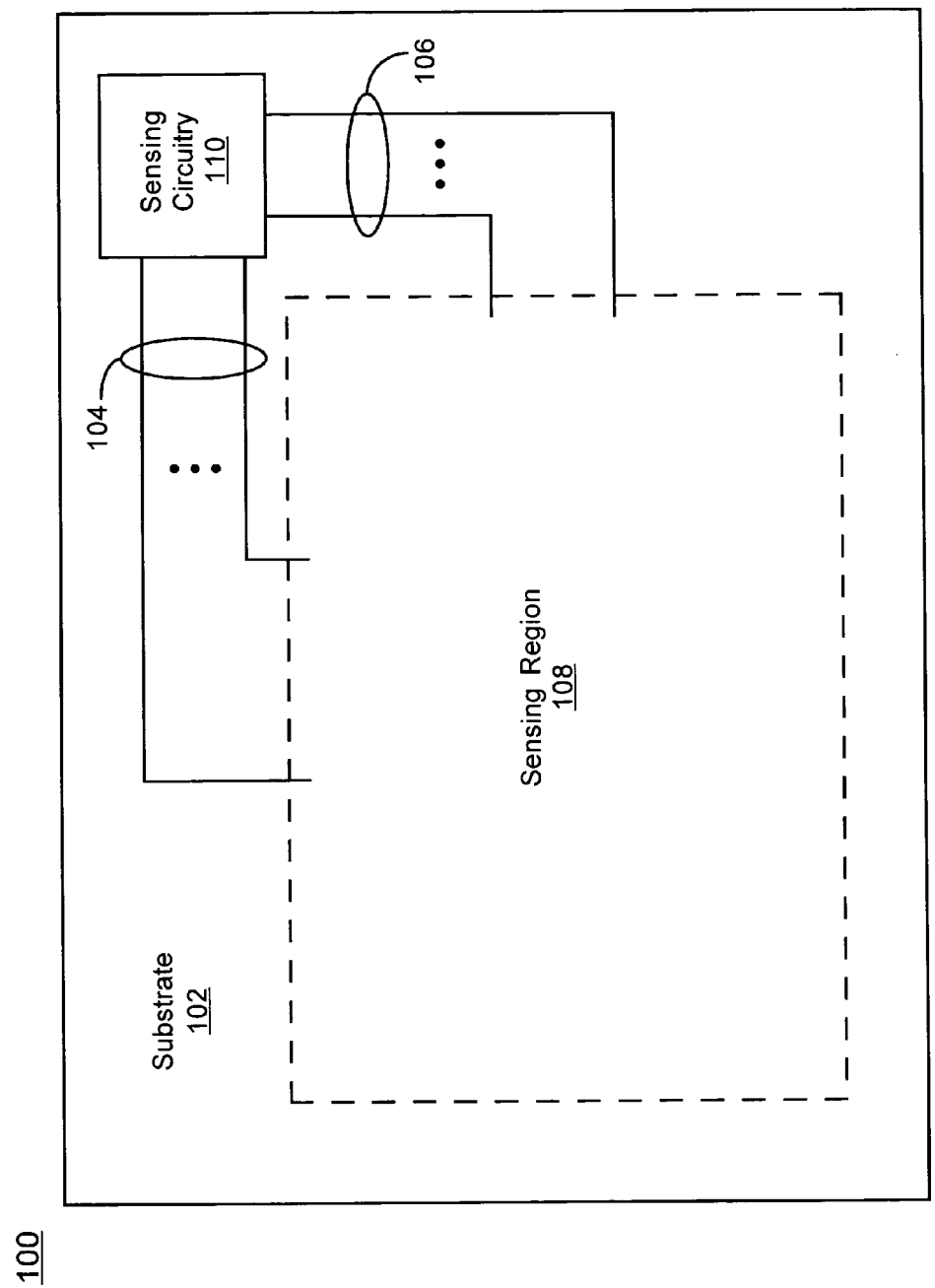
FIG. 1 is an exemplary capacitive touch screen device that can be implemented to include one or more embodiments of the invention.

FIG. 1 is a plan view of an exemplary single layer capacitive sensor apparatus 100 that can be implemented to include one or more embodiments of the present invention. The capacitive sensor apparatus 100 can be utilized to communicate user input (e.g., using a user's finger or a probe) to a computing device or other electronic device. For example, capacitive sensor device 100 can be implemented as a capacitive touch pad device that can be formed on a computing device or other electronic device to enable a user interfacing with the device. It is noted that one or more embodiments in accordance with the present invention can be incorporated with a capacitive touch pad device similar to capacitive sensor apparatus 100.

The capacitive sensor apparatus 100 when implemented as a touch pad can include a substrate 102 having a first set of conductive coupling traces 104 and a second set of conductive coupling traces 106 patterned (or formed) thereon. Substrate 102 of capacitive sensor apparatus 100 can be implemented with, but is not limited to, one or more opaque materials that are utilized as a substrate for a capacitive touch pad device. Conductive coupling traces 104 and/or 106 can be utilized for coupling any sensing elements (not shown) that would form a sensing region 108 with sensing circuitry 110 thereby enabling the operation of capacitive sensor apparatus 100. Conductive coupling traces 104 and 106 may each include one or more conductive coupling elements or traces. It is noted that embodiments of sensing element patterns in accordance with the invention are described herein which can be implemented to form sensing region 108.

Within FIG. 1, the capacitive sensor apparatus 100 can also be implemented as a capacitive touch screen device. For example, substrate 102 of capacitive sensor apparatus 100 can be implemented with, but is not limited to, one or more substantially transparent materials that are utilized as a substrate for a capacitive touch screen device.

Figure 2:
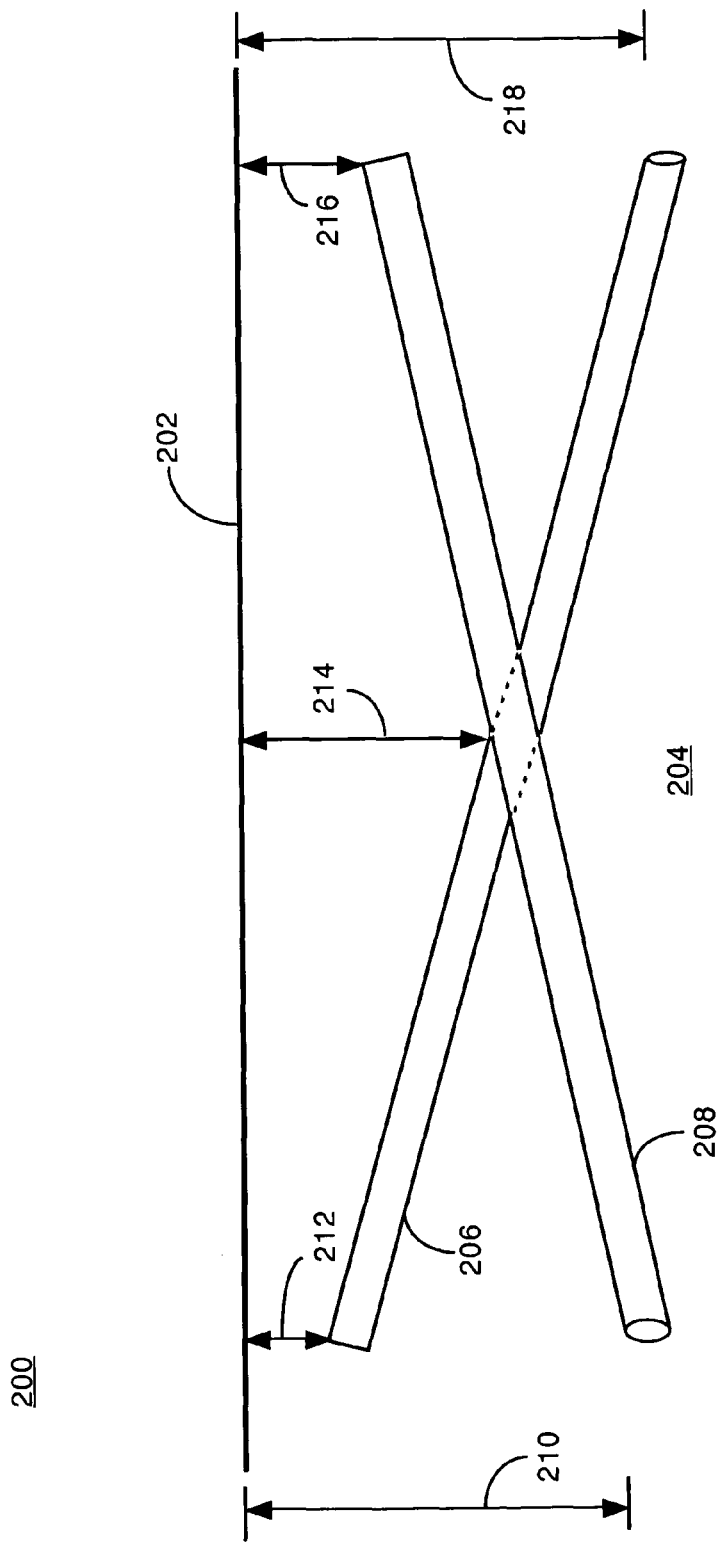
FIG. 2 is a side sectional view of an exemplary capacitive sensor pattern in accordance with embodiments of the invention.

FIG. 2 is a side sectional view of an exemplary capacitive sensor pattern 200 in accordance with embodiments of the invention. Specifically, sensor pattern 200 includes sensing elements 206 and 208 which can be utilized as part of a capacitive sensor apparatus (e.g., 100), such as but not limited to, a touchpad. When electrically coupled to sensing circuitry (e.g., 110), sensor pattern 200 provides positioning information which can be derived from which sensing element detects an object (e.g., a user's finger, a probe, and the like), and the proportional strength of the signals on sensing elements 206 and 208.

Each of sensing elements 206 and 208 can have a substantially constant width along its length and can be configured to have varying capacitive coupling to an object proximate to a capacitive sensing reference surface 202 along a first axis (e.g., X axis) of the reference surface 202. Note that the length of each of sensing elements 206 and 208 can be oriented along the first axis. The sensing elements 206 and 208 are conductive, and are configured to provide information corresponding to a spatial location of the object relative to the first axis of the capacitive sensing reference surface 202. Note that sensing elements 206 and 208 can separately provide the information corresponding to a spatial location of the object.

Within FIG. 2, each of sensing elements 206 and 208 can include a strip of conductive material that is substantially straight and decreases in distance relative to the capacitance sensing surface 202 along the first axis. Therefore, when sensing element 206 is coupled with sensing circuitry (e.g., 110), it can have varying capacitive coupling to an object proximate to the sensing reference surface 202 as the object moves along the length of sensing element 206. As such, a different signal strength is provided by sensing element 206 that is associated with each position or location along its length. It is appreciated that when sensing element 208 is coupled with sensing circuitry (e.g., 110), it can operate in a manner similar to sensing element 206, as described above.

Specifically, sensing elements 206 and 208 of sensor pattern 200 can be embedded within a substrate material (e.g., 102). The distance that sensing element 206 is separated from the capacitive sensing reference surface 202 varies along the length of sensing element 206. For example, distance (or depth) 212 is the closest that sensing element 206 is to the capacitive sensing reference surface 202 while distance (or depth) 218 is the furthest that the upper surface of sensing element 206 is from reference surface 202. The upper surface of sensing element 206 increasingly slopes away from capacitive sensing reference surface 202. Moreover, the distance that sensing element 208 is separated from the capacitive sensing reference surface 202 also varies along its length. For example, distance (or depth) 216 is the closest that sensing element 208 is to the capacitive sensing reference surface 202 while distance (or depth) 210 is the furthest that the upper surface of sensing element 208 is from reference surface 202. The upper surface of sensing element 208 increasingly slopes away from capacitive sensing reference surface 202.

Within FIG. 2, note that distances 212 and 210 of sensing element 206 are different than distances 216 and 218, respectively, of sensing element 208. As such, when sensing elements 206 and 208 are coupled to sensing circuitry (e.g., 110), the proportional strength signals provided by them is unique as an object proximately located to sensing reference surface 202 travels along the length of sensing elements 206 and 208. Therefore, the sensing circuitry can identify the spatial location of the object relative to the first axis of the capacitive sensing reference surface 202.

Figure 3:
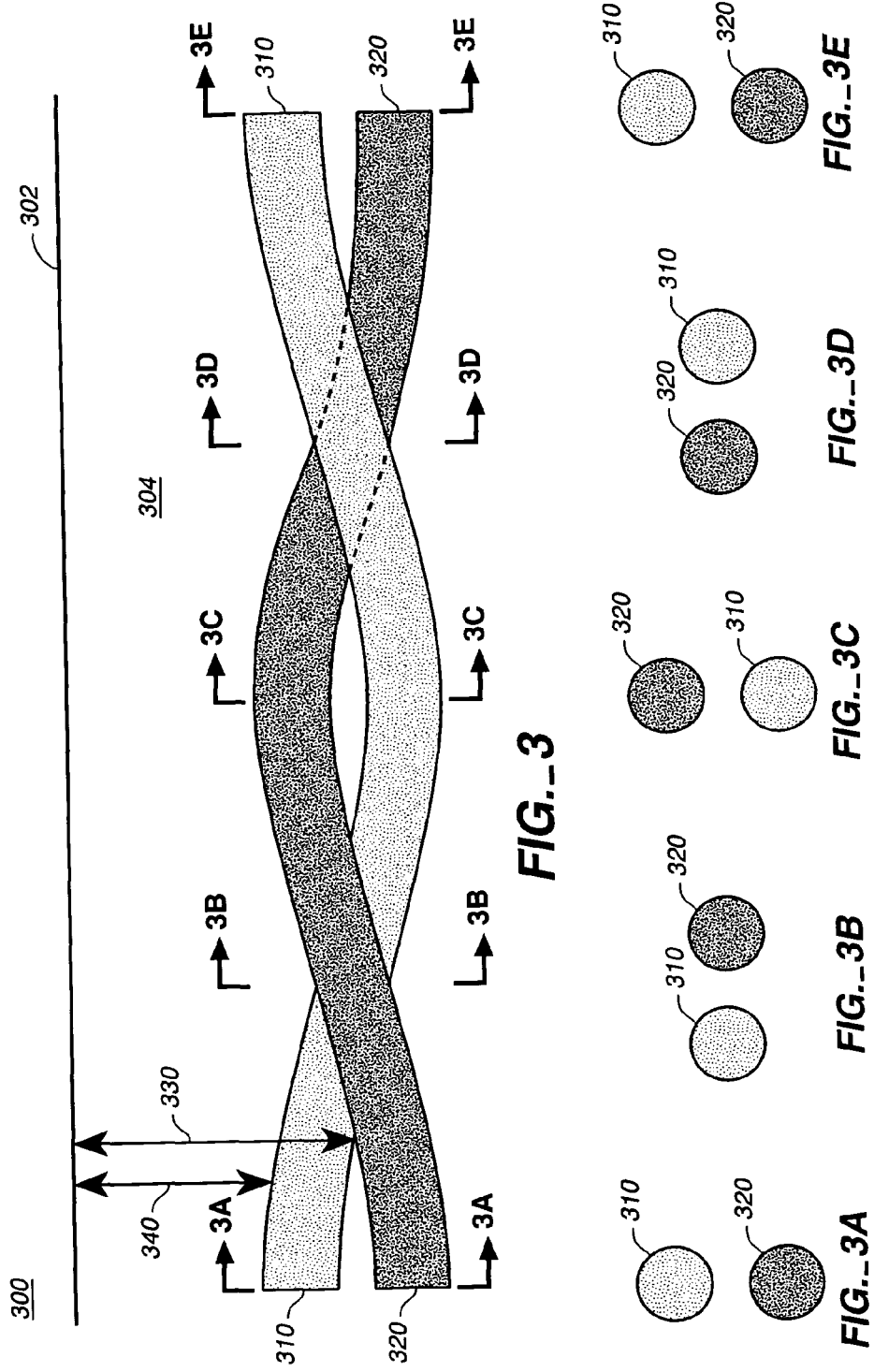
FIG. 3 is a side sectional view of an exemplary capacitive sensor pattern in accordance with embodiments of the invention.

FIG. 3 is a side sectional view of an exemplary capacitive sensor pattern 300 in accordance with embodiments of the invention. Specifically, sensor pattern 300 includes sensing elements 310 and 320 which can be utilized as part of a capacitive sensor apparatus (e.g., 100), such as but not limited to, a touchpad. When electrically coupled to sensing circuitry (e.g., 110), sensor pattern 300 provides positioning information which can be derived from which sensing element detects an object (e.g., a user's finger, a probe, and the like), and the proportional strength of the signals on sensing elements 310 and 320.

Sensing elements 310 and 320 can be twisted about a common axis. For example, FIG. 3A is a general cross sectional view at section 3A-3A showing sensing element 310 located above sensing element 320 while FIG. 3B is a general cross sectional view at section 3B-3B showing sensing element 310 located to the left of sensing element 320. Additionally, FIG. 3C is a general cross sectional view at section 3C-3C showing sensing element 310 located beneath sensing element 320 while FIG. 3D is a general cross sectional view at section 3D-3D showing sensing element 310 located to the right of sensing element 320. And finally, FIG. 3E is a general cross sectional view at section 3E-3E showing sensing element 310 located above sensing element 320. Note that since sections 3A-3A and 3E-3E show sensing elements 310 and 320 similarly situated, it may be desirable to have one of these sections outside the sensing region (e.g., 108) of a capacitive sensing apparatus in order to eliminate the possibility of sensing circuitry receiving similar strength signals that correspond to two different positions of sensor pattern 300.

Within FIG. 3, each of sensing elements 310 and 320 can have a substantially constant width along its length and is configured to have varying capacitive coupling to an object proximate to a capacitive sensing reference surface 302 along a first axis (e.g., X axis) of the reference surface 302. Note that the length of each of sensing elements 310 and 320 can be oriented along the first axis. The sensing elements 310 and 320 can be conductive, and are configured to provide information corresponding to a spatial location of the object relative to the first axis of the capacitive sensing reference surface 302. Sensing elements 310 and 320 can separately provide the information corresponding to the spatial location of the object.

The capacitive coupling associated with sensing element 310 can vary with the varying distance of portions of sensing element 310 with respect to the capacitive sensing reference surface 302. Additionally, the capacitive coupling associated with the sensing element 320 can vary with the varying distance of portions of sensing element 320 with respect to the capacitive sensing reference surface 302. Note that the varying distance of the portions of sensing element 310 are different from the varying distance of the portions of sensing element 320. The capacitive coupling of sensing element 310 can include a first waveform (e.g., sinusoidal waveform) while the capacitive coupling of sensing element 320 can include a second waveform (e.g., sinusoidal waveform). The capacitive coupling of sensing element 310 can include a first phase while the capacitive coupling of sensing element 320 can include a second phase different from the first phase. For example, the capacitive coupling of sensing element 310 can be 180 degrees out of phase with the capacitive coupling of sensing element 320.

Note that any waveform mentioned herein with reference to embodiments in accordance with the invention can be implemented in a wide variety of ways. For example, a waveform can be implemented as, but is not limited to, a sinusoidal waveform, a triangular waveform, etc. It is appreciated that these exemplary waveforms are in no way an exhaustive listing of waveforms that can be implemented as part of embodiments in accordance with the invention. It is noted that every continuous function can be a waveform in accordance with embodiments of the invention.

Within FIG. 3, each of sensing elements 310 and 320 can include a strip of conductive material. Additionally, the strip of conductive material of sensing element 310 and the strip of conductive material of sensing element 320 can be twisted about a common axis. Therefore, when sensing element 310 is coupled with sensing circuitry (e.g., 110), it can have varying capacitive coupling to an object proximate to the sensing reference surface 302 as the object moves along the length of sensing element 310. As such, a different signal strength is provided by sensing element 310 that is associated with each position or location along its length. It is understood that when sensing element 320 is coupled with sensing circuitry (e.g., 110), it can operate in a manner similar to sensing element 310, as described above.

Specifically, sensing elements 310 and 320 of sensor pattern 300 can be embedded within a substrate material (e.g., 304). The distance (or depth) 340 that sensing element 310 is separated from the capacitive sensing reference surface 302 varies along the length of sensing element 310. Additionally, the distance (or depth) 330 that sensing element 320 is separated from the capacitive sensing reference surface 302 varies along the length of sensing element 320.

Within FIG. 3, since the conductive strips of sensing elements 310 and 320 are twisted about a common axis, it is noted that depending on the location of sensing element 310, it can interfere with the capacitive coupling with an object of sensing element 320 (and vice versa). For example, if an object was proximately located to reference surface 302 at section 3A-3A, sensing element 310 would shield (or limit) the capacitive coupling that sensing element 320 would have to the object since sensing element 310 is located between sensing element 320 and the object. Alternatively, if the object was proximately located to reference surface 302 at section 3C-3C, sensing element 320 would shield (or limit) the capacitive coupling that sensing element 310 would have to the object since sensing element 320 is located between sensing element 310 and the object.

Figure 4:
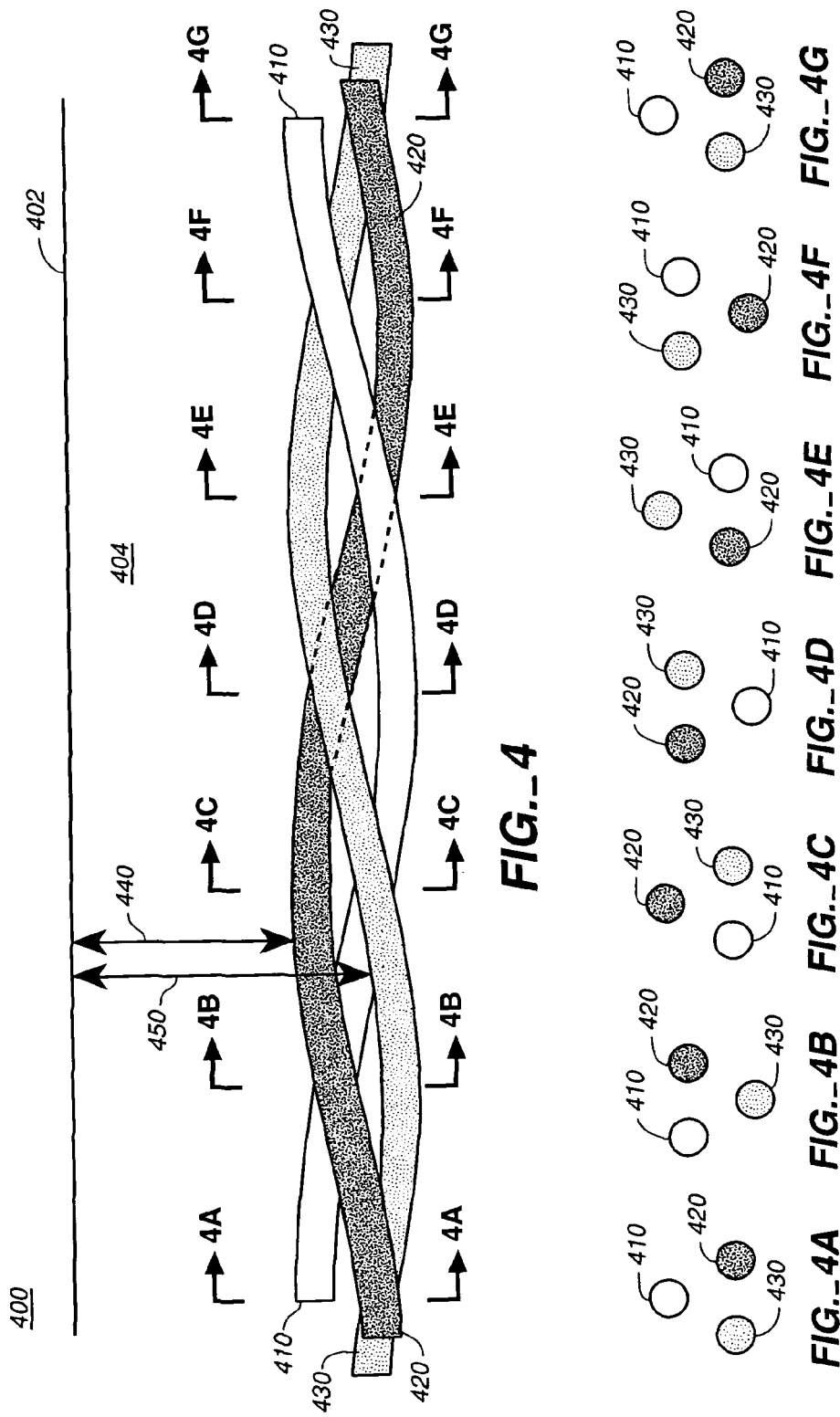
FIG. 4 is a side sectional view of an exemplary capacitive sensor pattern in accordance with embodiments of the invention.

FIG. 4 is a side sectional view of an exemplary capacitive sensor pattern 400 in accordance with embodiments of the invention. Specifically, sensor pattern 400 includes sensing elements 410, 420, and 430 which can be utilized as part of a capacitive sensor apparatus or device (e.g., 100), such as but not limited to, a touchpad. When electrically coupled to sensing circuitry (e.g., 110), sensor pattern 400 provides positioning information which can be derived from which sensing element detects an object (e.g., a user's finger, a probe, and the like), and the proportional strength of the signals on sensing elements 410, 420, and 430.

Sensing elements 410, 420, and 440 can be twisted about a common axis. For example, FIG. 4A is a general cross sectional view at section 4A-4A showing sensing element 430 located to the left of sensing element 420 and sensing element 410 located above sensing elements 420 and 430. FIG. 4B is a general cross sectional view at section 4B-4B showing sensing element 410 located to the left of sensing element 420 and sensing element 430 located beneath sensing elements 410 and 420. Additionally, FIG. 4C is a general cross sectional view at section 4C-4C showing sensing element 410 located to the left of sensing element 430 and sensing element 420 located above sensing elements 410 and 430. FIG. 4D is a general cross sectional view at section 4D-4D showing sensing element 420 located to the left of sensing element 430 and sensing element 410 located beneath sensing elements 420 and 430. FIG. 4E is a general cross sectional view at section 4E-4E showing sensing element 420 located to the left of sensing element 410 and sensing element 430 located above sensing elements 410 and 420. FIG. 4F is a general cross sectional view at section 4F-4F showing sensing element 430 located to the left of sensing element 410 and sensing element 420 located beneath sensing elements 410 and 430. And finally, FIG. 4G is a general cross sectional view at section 4G-4G showing sensing element 430 located to the left of sensing element 420 and sensing element 410 located above sensing elements 420 and 430. Note that since sections 4A-4A and 4E-4E show sensing elements 410, 420, and 430 similarly situated, it may be desirable to have one of these sections outside the sensing region (e.g., 108) of a capacitive sensing apparatus (e.g., 100) in order to eliminate the possibility of sensing circuitry (e.g., 110) receiving similar strength signals that correspond to two different positions (or locations) of sensor pattern 400.

Within FIG. 4, each of sensing elements 410, 420, and 430 has varying depth relative to a capacitive sensing reference surface 402 and are substantially parallel to each other. For example, sensing elements 420 and 430 are substantially parallel to sensing element 410. Each of sensing elements 410, 420, and 430 can have varying depth (or distance) relative to reference surface 402 and each can include a waveform. However, the waveform of sensing element 420 can be offset from the waveform of sensing element 410 by one third of a period. Also, the waveform of sensing element 430 can be offset from the waveform of sensing element 410 by two thirds of a period. The sensing elements 410, 420, and 430 can be configured to provide (e.g., sensing circuitry) information corresponding to a position of an object proximate to the capacitive sensing reference surface 402 along a first axis of the capacitive sensing reference surface 402. The sensing elements 410, 420, and 430 can each include a conductive trace. Portions of each of sensing elements 410, 420, and 430 can be configured to have a capacitive coupling with respect to the object wherein the capacitive coupling varies along the first axis.

Note that the position of the object can be determined using a signal corresponding to sensing element 410, a signal corresponding to sensing element 420, and a signal corresponding to sensing element 430. The sensing elements 410, 420, and 430 can provide a cumulative output signal that is substantially constant at different locations along the sensing elements 410, 420, and 430. Each of sensing elements 410, 420, and 430 can include a strip of conductive material. Additionally, the strip of conductive material of sensing element 410, the strip of conductive material of sensing element 420, and the strip of conductive material of sensing element 430 can be twisted about a common axis. Therefore, when sensing element 410 is coupled with sensing circuitry (e.g., 110), it can have varying capacitive coupling to an object proximate to the sensing reference surface 402 as the object moves along the length of sensing element 410. As such, a different signal strength is provided by sensing element 410 that is associated with each position or location along its length. It is appreciated that when sensing elements 420 and 430 are coupled with sensing circuitry (e.g., 110), they can operate in a manner similar to sensing element 410, as described above.

Figure 6:
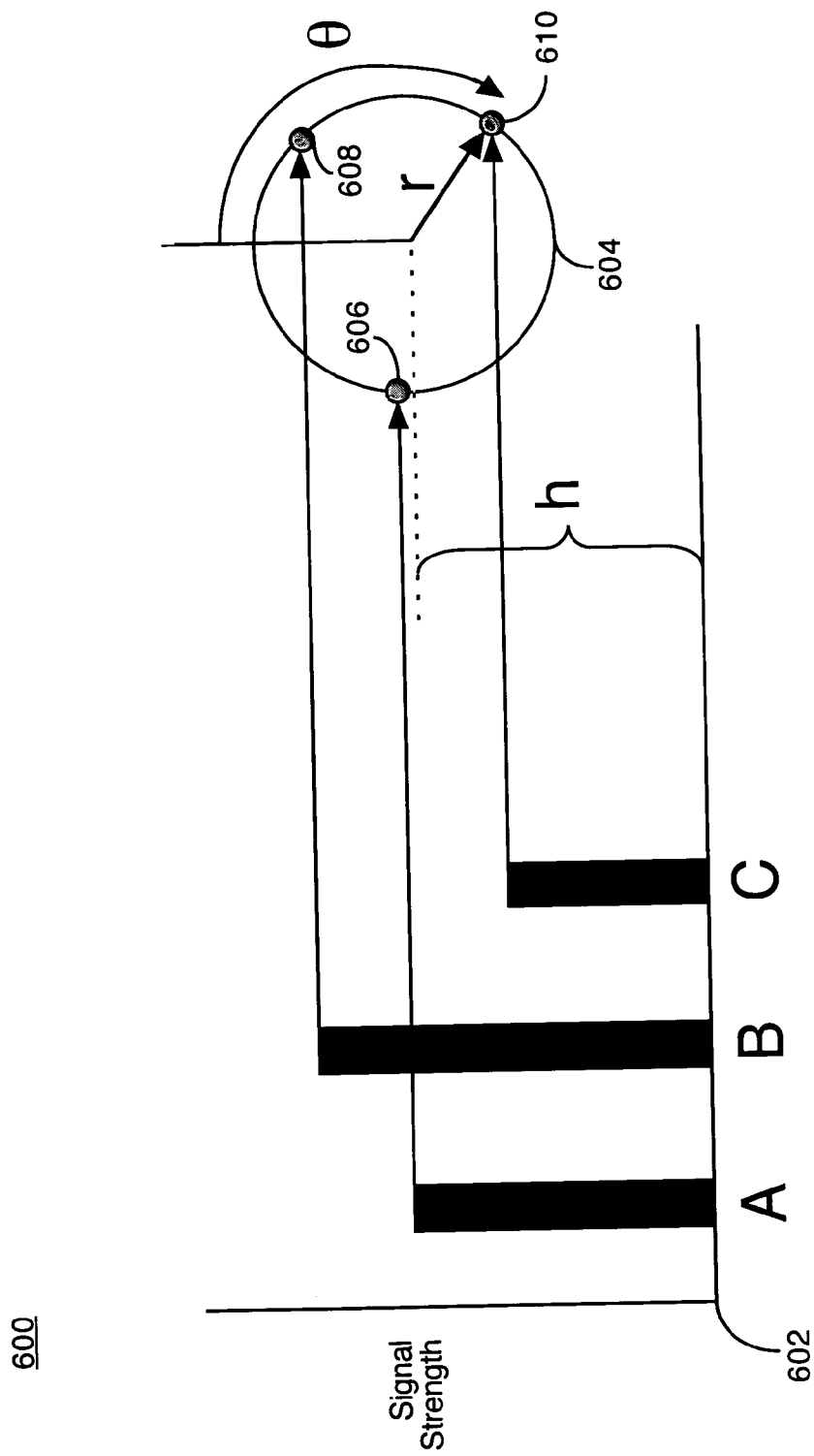
FIG. 6 illustrates an exemplary signal strength chart along with its conversion into polar coordinates in accordance with embodiments of the invention.

There are a wide variety of ways for determining a location (or position) of an object in relation to the length of sensor pattern 400 using signals output by sensing elements 410, 420, and 430. For instance, FIG. 6 illustrates an exemplary signal strength chart 602 along with its conversion into polar coordinates in accordance with embodiments of the invention. For example, suppose signal "A" is associated with sensing element 410 (FIG. 4), signal "B" is associated with sensing element 420, and signal "C" is associated with sensing element 430. As such, based on the signal strength shown within chart 602, it can be determined that the object is located along sensor 400 where sensing trace 420 is nearest to sensing surface 402, the sensing trace 410 is the second nearest to sensing surface 402, and the sensing trace 430 is the farthest from sensing surface 402. Therefore, within this example, the object is located on the right-hand side of the section 4C-4C of sensor pattern 400.

More specifically, suppose signal "A" corresponds to sensing element 410, signal "B" corresponds to sensing element 420, and signal "C" corresponds to sensing element 430, as mentioned above. And further suppose that sensing elements (or traces) 410, 420, and 430 have been observed to give values $A_0$, $B_0$, and $C_0$, respectively, when no object is present or near sensor pattern 400. As such, let $a = A - A_0$, $b = B - B_0$, and $c = C - C_0$.

Therefore, determination of the polar coordinates "h", "r", and angle θ that are associated with signals A, B, and C can be performed.

Within FIG. 6, it is noted that the value of "h" corresponds to the height of the center of a circle 604 upon which points 606, 608, and 610 can be located. The points 606, 608, and 610 are associated with signals A, B, and C, respectively. The value of "r" corresponds to the radius of circle 604. The value of angle θ can be used to ascertain the linear location (or position) of an object in relationship (or proximity) to the length of sensor pattern 400. Specifically, the value of height "h" can be determined by using the following relationship:

$h = (a+b+c)/3$

Once "h" has been determined, the radius "r" can then be determined utilizing the following relationship:

$r = sqrt((2/3) \times [(a-h)^2 + (b-h)^2 + (c-h)^2])$ where "sqrt" represents the square root function. Once "r" has been determined, the angle θ can then be determined utilizing one of the following relationships:

$\theta = \sin^{-1}((a-h)/r)$

OR $\theta = \sin^{-1}((b-h)/r)$

OR $\theta = \sin^{-1}((c-h)/r)$

Once the angle θ has been determined, it can then be converted into a distance that corresponds to a linear position measured along the length of sensor pattern 400 from one of its end points. For example, each degree of angle θ may be equal to a specific distance (e.g., a specific number of millimeters or inches) from one of the end points of sensor pattern 400. Alternatively, a lookup table may be utilized to ascertain the distance that corresponds to the determined θ. It is noted that the angle θ can provide the location of the center of the object along sensor pattern 400 while the "h" and the "r" can provide information regarding the size of the object.

One of the advantages of determining the position along the first axis (e.g., X axis) of sensor pattern 400 in the manner described above is that common-mode noise has no effect on the determination of "r" and θ.

Within FIG. 6, it is noted that angle θ can alternatively be determined utilizing the following relationships:

$\cos \theta = a - (b+c)/2$ $$\sin \theta = sqrt(3)/2(b-c)$$

$$\theta = A\, TAN\, 2(\cos \theta, \sin \theta)$$

wherein "A TAN 2" represents the arc tangent function. It is appreciated that the above three relationships may be more convenient for use with a smaller microprocessor.

Within FIG. 4, sensing elements 410, 420, and 430 of sensor pattern 400 can be embedded within a substrate material (e.g., 404). For example, the distance (or depth) 440 that sensing element 420 is separated from the capacitive sensing reference surface 402 varies along the length of sensing element 420. Additionally, the distance (or depth) 450 that sensing element 430 is separated from the capacitive sensing reference surface 402 varies along the length of sensing element 430. Note that sensing element 410 can be implemented in a manner similar to sensing elements 420 and 430.

Since sensing elements 410, 420, and 430 are twisted about a common axis, it is noted that depending on their location, two of them can interfere with the capacitive coupling with an object of the remaining sensing element. For example, if an object was proximately located to reference surface 402 at section 4D-4D, sensing elements 420 and 430 would shield (or limit) the capacitive coupling that sensing element 410 would have to the object since sensing element 420 and 430 are located between sensing element 410 and the object.

Figure 5:
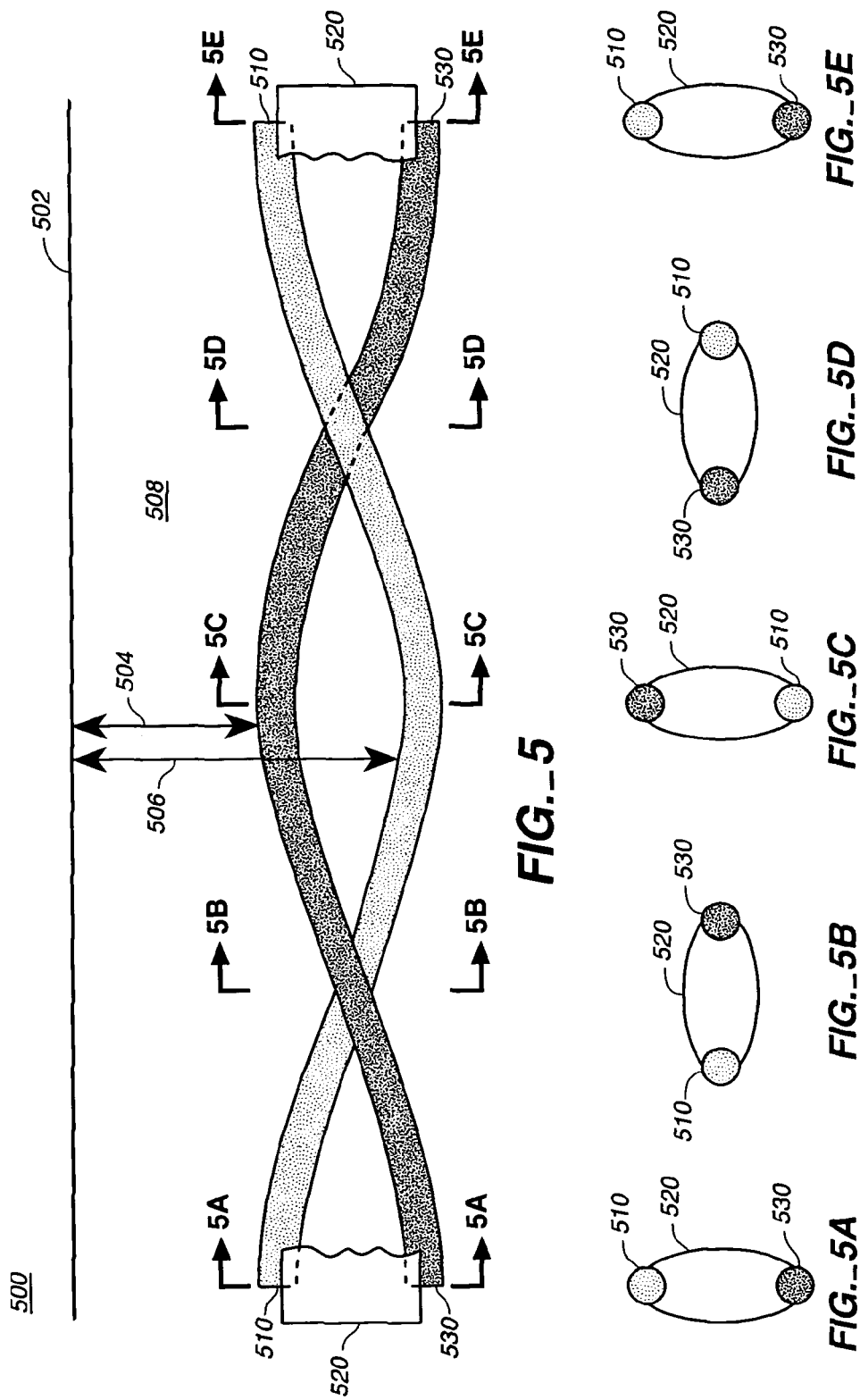
FIG. 5 is a side sectional view of an exemplary capacitive sensor pattern in accordance with embodiments of the invention.

FIG. 5 is a side sectional view of an exemplary capacitive sensor pattern 500 in accordance with embodiments of the present invention. Specifically, sensor pattern 500 includes sensing elements 510 and 530 which can be utilized as part of a capacitive sensor apparatus (e.g., 100), such as but not limited to, a touchpad. When electrically coupled to sensing circuitry (e.g., 110), sensor pattern 500 provides positioning information which can be derived from which sensing element detects an object (e.g., a user's finger, a probe, and the like), and the proportional strength of the signals on sensing elements 510 and 530.

Sensing elements 510 and 530 can be twisted about a mandrel 520 that provides them a common axis. For example, FIG. 5A is a general cross sectional view at section 5A-5A showing sensing element 510 located above mandrel 520 which is located above sensing element 530. FIG. 5B is a general cross sectional view at section 5B-5B showing sensing element 510 located to the left of mandrel 520 and sensing element 530 located to the right of mandrel 520. Additionally, FIG. 5C is a general cross sectional view at section 5C-5C showing sensing element 510 located beneath mandrel 520 which is located beneath sensing element 530. FIG. 5D is a general cross sectional view at section 5D-5D showing sensing element 510 located to the right of mandrel 520 and sensing element 530 located to the left of mandrel 520. FIG. 5E is a general cross sectional view at section 5E-5E showing sensing element 510 located above mandrel 520 which is located above sensing element 530. Note that since sections 5A-5A and 5E-5E show mandrel 520 and sensing elements 510 and 530 similarly situated, it may be desirable to have one of these sections outside the sensing region (e.g., 108) of a capacitive sensing apparatus (e.g., 100) in order to eliminate the possibility of sensing circuitry (e.g., 110) receiving similar strength signals that correspond to two different positions of sensor pattern 500.

Within FIG. 5, each of sensing elements 510 and 530 can have a substantially constant width along its length and is configured to have varying capacitive coupling to an object proximate to a capacitive sensing reference surface 502 along a first axis (e.g., X axis) of the reference surface 502. Note that the length of each of sensing elements 510 and 530 can be oriented along the first axis (e.g., mandrel 520). The sensing elements 510 and 530 can be conductive, and are configured to provide information corresponding to a spatial location of the object relative to the first axis of the capacitive sensing reference surface 502. Sensing elements 510 and 530 can separately provide the information corresponding to the spatial location of the object.

The capacitive coupling associated with sensing element 510 can vary with the varying distance of portions of sensing element 510 with respect to the capacitive sensing reference surface 502. Additionally, the capacitive coupling associated with the sensing element 530 can vary with the varying distance of portions of sensing element 530 with respect to the capacitive sensing reference surface 502. Note that the varying distance of the portions of sensing element 510 are different from the varying distance of the portions of sensing element 530. The capacitive coupling of sensing element 510 can include a first waveform (e.g., sinusoidal waveform) while the capacitive coupling of sensing element 530 can include a second waveform (e.g., sinusoidal waveform). Note that every continuous function can be a waveform. The capacitive coupling of sensing element 510 can include a first phase while the capacitive coupling of sensing element 530 can include a second phase different from the first phase. For example, the capacitive coupling of sensing element 510 can be 180 degrees out of phase with the capacitive coupling of sensing element 530, but is not limited to such.

Within FIG. 5, each of sensing elements 510 and 530 can include a strip of conductive material. Additionally, the strip of conductive material of sensing element 510 and the strip of conductive material of sensing element 530 can be twisted about mandrel 520. Therefore, when sensing element 510 is coupled with sensing circuitry (e.g., 110), it can have varying capacitive coupling to an object proximate to the sensing reference surface 502 as the object moves along the length of sensing element 510. As such, a different signal strength is provided by sensing element 510 that is associated with each position or location along its length. It is understood that when sensing element 530 is coupled with sensing circuitry (e.g., 110), it can operate in a manner similar to sensing element 510, as described above.

Specifically, sensing elements 510 and 530 of sensor pattern 500 can be embedded within a substrate material (e.g., 508). The distance (or depth) 506 that sensing element 510 is separated from the capacitive sensing reference surface 502 varies along the length of sensing element 510. Additionally, the distance (or depth) 504 that sensing element 530 is separated from the capacitive sensing reference surface 502 varies along the length of sensing element 530.

Within FIG. 5, since the conductive strips of sensing elements 510 and 530 are twisted about mandrel 520, it is noted that depending on the location of sensing element 510, it and mandrel 520 can interfere with the capacitive coupling with an object of sensing element 530 (and vice versa). For example, if an object was proximately located to reference surface 502 at section 5A-5A, sensing element 510 and mandrel 520 would shield (or limit) the capacitive coupling that sensing element 530 would have to the object since sensing element 510 and mandrel 520 are located between sensing element 530 and the object. Alternatively, if the object was proximately located to reference surface 502 at section 5C-5C, sensing element 530 and mandrel 520 would shield (or limit) the capacitive coupling that sensing element 510 would have to the object since sensing element 530 and mandrel 520 are located between sensing element 510 and the object.

Figure 7A:
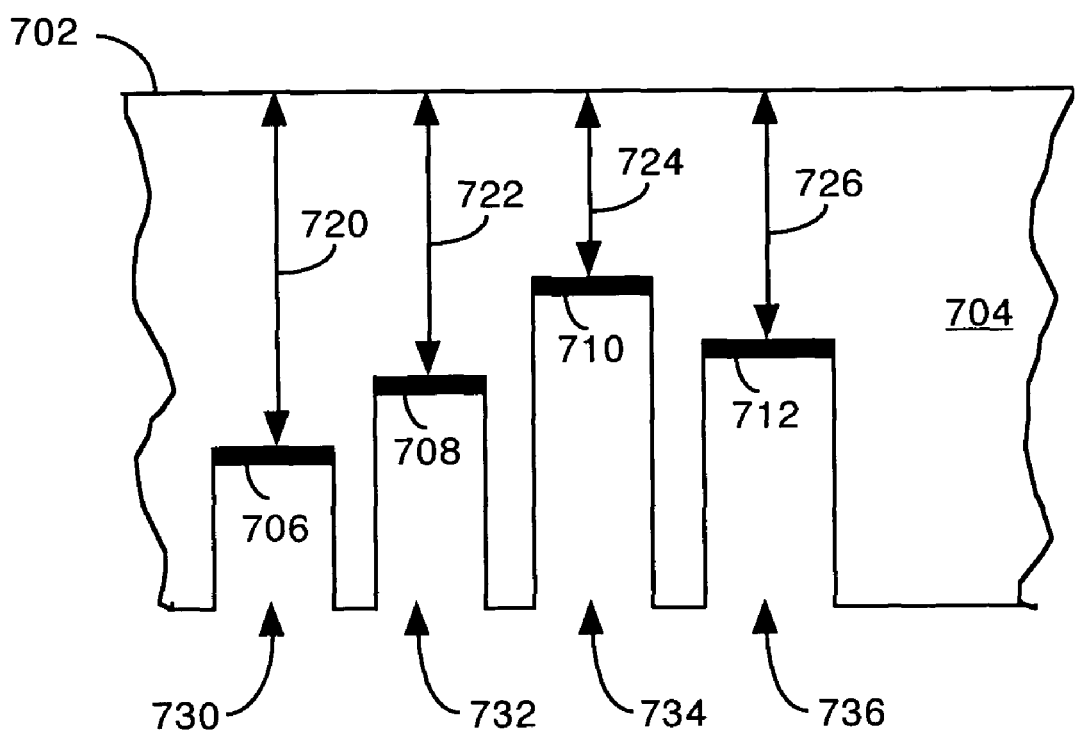
FIG. 7A is a cross sectional view of an exemplary capacitive sensor pattern in accordance with embodiments of the invention.

FIGS. 7A-7E are described in combination in order to provide a better understanding of an exemplary capacitive sensor pattern 700a, in accordance with embodiments of the invention. Specifically, FIG. 7A is a cross sectional view of capacitive sensor pattern 700a in accordance with embodiments of the invention. Additionally, FIGS. 7B, 7C, 7D, 7E are lengthwise side sectional views 700b, 700c, 700d, and 700e, respectively, of capacitive sensor pattern 700a in accordance with embodiments of the invention.

Sensor pattern 700a includes sensing elements 706, 708, 710, and 712 which can be utilized as part of a two-dimensional capacitive sensor apparatus (e.g., 100), such as but not limited to, a touchpad. When electrically coupled, sensor pattern 700a provides positioning information from a sensor pattern that has substantially parallel traces (or elements) with no crossovers. The positioning information can be derived from which sensing element or elements detect an object (e.g., a user's finger, a probe, and the like) proximate to a sensing reference surface 702, and the proportional strength of the signals on sensing elements 706, 708, 710, and 712.

Specifically, capacitive sensor pattern 700a can include an insulating substrate material 704 having a substantially smooth, planar capacitive sensing reference surface 702 where an object (e.g., a user's finger, a probe, and the like) can contact or be proximately located thereto. The substrate 704 includes substantially parallel channels or grooves) 730, 732, 734, and 736. Along the length of each of channels 732, 734, and 736 can include an undulating waveform surface that varies in distance (or depth) from reference surface 702. Additionally, channels 732, 734, and 736 can be implemented to include three phases. However, along the length of groove 730, its distance from reference surface 702 can be substantially constant. A conductive material can be deposited within channels 730, 732, 734, and 736 to produce sensing elements 706, 708, 710, and 712, respectively. Therefore, sensing elements 710, 712, and 708 can each include a waveform that varies in distance from reference surface 702 as shown in FIGS. 7B, 7C, and 7D, respectively. When coupled to sensing circuitry (e.g., 110), sensing elements (or traces) 708, 710, and 712 can be used to determine a position of an object relative to a first axis (e.g., X axis) of the sensing reference surface 702 while sensing element 706 can be used to determine a position of the object relative to a second axis (e.g., Y axis) of the reference surface 702. The second axis may be non-parallel (e.g., substantially perpendicular) to the first axis.

Within FIGS. 7A-7E, a conductive material can be deposited within channels 730, 732, 734, and 736 to produce sensing elements 706, 708, 710, and 712, respectively. Within one embodiment, each of sensing elements 708, 710, and 712 can be disposed above substrate 704, wherein the varying depths of channels 732, 734, and 736 define a unique depth (or distance) profile for each of sensing elements 708, 710, and 712, respectively. The deposition of the conductive material may be implemented in a wide variety of ways (e.g., printing, spraying on, painting on, and the like). The sensing elements 706, 708, 710, and 712 can be formed by the deposition of any one conductive material or may include layers of conductive materials such as, but not limited to, black chrome, aluminum, titanium, and the like. Although the foregoing materials are mentioned specifically, it is understood that any conductive material that can be deposited into channels 730, 732, 734, and 736 to form sensing elements 706, 708, 710, and 712, respectively, can be used.

Sensing elements (or traces) 708, 710, and 712 have varying depths 722, 724, and 726, respectively, with respect to sensing reference surface 702. However, sensing element (or trace) 706 has a substantially constant depth 720 with respect to sensing reference surface 702. In accordance with one embodiment, sensing elements 708, 710, and 712 each includes a waveform having varying depth (or distance) from reference surface 702, each of which has a different phase. For example, within the present embodiment, if the waveform shape of conductive trace 708 is substantially equal to sin θ, then the waveform shape of conductive trace 710 may be substantially equal to sin (θ+120 degrees), while the waveform shape of conductive trace 712 may be substantially equal to sin (θ+240 degrees). Alternatively, the waveform of sensing element 710 may be offset (or shifted) from the waveform of conductive trace 708 by 2π/3 radians while the waveform of sensing element 712 may be offset (or shifted) from the waveform of conductive trace 708 by 4π/3 radians. In another embodiment, the waveform of sensing element 710 can be offset from the waveform of sensing element 708 by one third of a period while the waveform of sensing element 712 can be offset from the waveform of sensing element 708 by two thirds of a period. However, it is understood that the phase and shape of the waveform of sensing elements 708, 710, and 712 are not in any way limited to the present embodiment or the recited embodiments.

Within FIG. 7A-7E, it is understood that the position of the object can be determined using a signal corresponding to sensing element 708, a signal corresponding to sensing element 710, and a signal corresponding to sensing element 712. The sensing elements 708, 710, and 712 can provide a cumulative output signal that is substantially constant at different locations along the sensing elements 708, 710, and 712. There are a wide variety of ways for determining a location (or position) of an object in relation to the length of sensor pattern 700a using signals output by sensing elements 708, 710, and 712. For example, the determination of the location (or position) of an object in relation to the length of sensor pattern 700a can be implemented in a manner similar to that described herein with reference to FIGS. 4 and 6, but is not limited to such.

Note that capacitive sensor pattern 700a may have been fabricated utilizing a process 1600 of FIG. 16 described below, or by other processes (e.g., that may include machining an insulating material with the desired depth variations).

Figure 8:
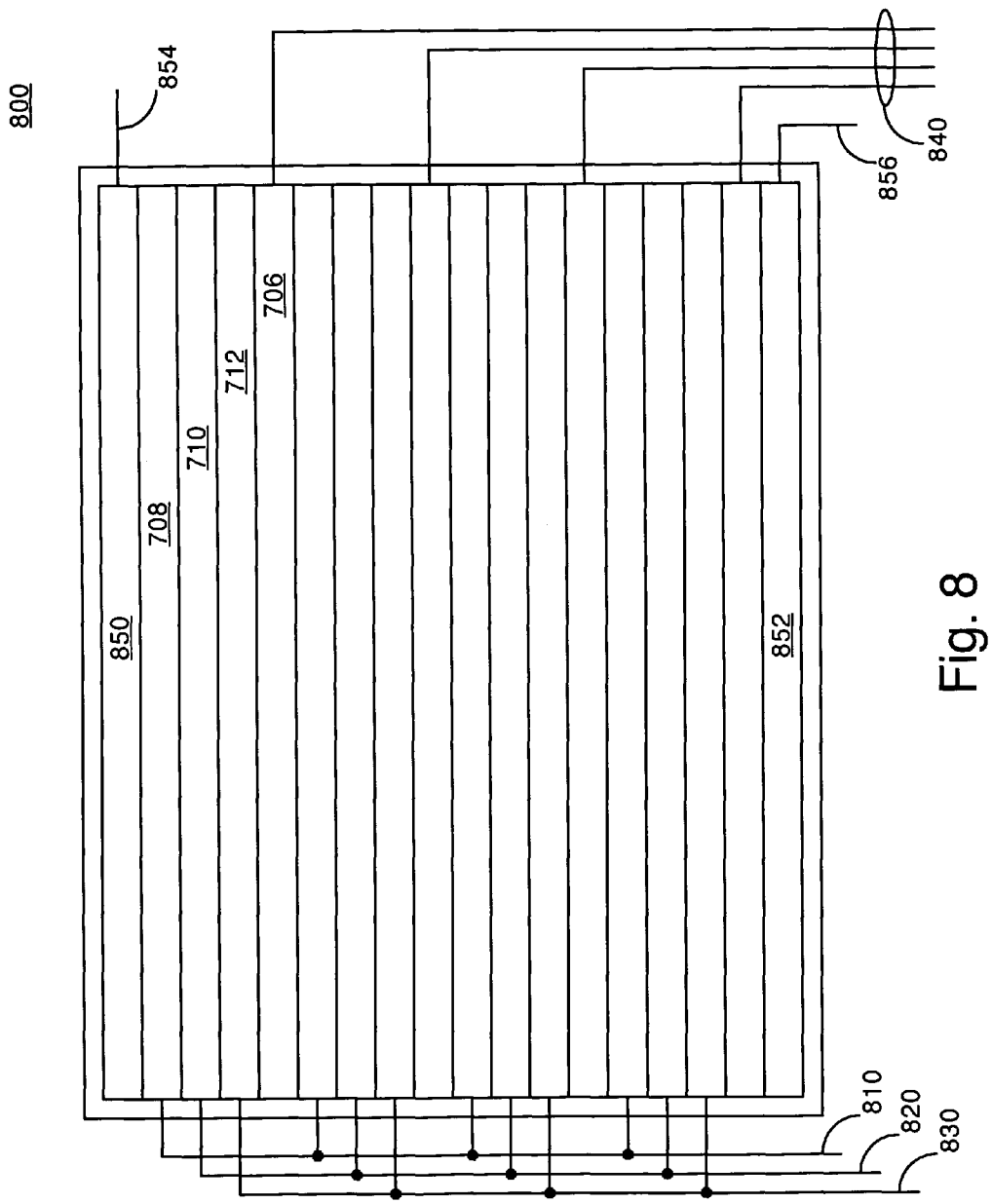
FIG. 8 is a plan view of an exemplary capacitive sensor pattern including electrical connections in accordance with embodiments of the invention.

FIG. 8 is a plan view of an exemplary capacitive sensor pattern 800 including electrical connections, in accordance with embodiments of the invention. Specifically, sensor pattern 800 includes four repeating sets of sensing elements 706, 708, 710, and 712. Note that sensing elements 708, 710, and 712 can each have varying depth (or distance) from the sensing reference surface (not shown) while sensing element 706 can have a substantially constant depth (or distance) from the sensing reference surface. The sensing elements 708, 710, and 712 can include waveforms that have three phases, but are not limited to such.

Within the present embodiment, each of sensing elements 708 is coupled with electrical trace 810, each of sensing elements 710 is coupled with trace 820, and each of sensing elements 712 is coupled with trace 830. However, each of sensing elements 706 is coupled independently with traces 840. Traces 810, 820, 830, and 840 can be coupled with traces 104 and/or 106 of FIG. 1. When coupled in this manner, the sensor pattern 800 can be utilized to form the sensing region 108. Sensing elements 708, 710, and 712 can be used to determine the x-position, or first axis location, of an object (e.g., a finger, a probe, a stylus, etc.) relative to sensor pattern 800. Sensing elements 706 can be used to determine the y-position, or second axis location, of an object (e.g., a finger, a probe, a stylus, etc.) relative to sensor pattern 800.

In another embodiment, each of sensing elements 708, 710, and 712 can be coupled independently with sensing circuitry (e.g., 110), in which case the y-position of an object could be determined directly from each trace. As such, each sensing element 706 may be excluded from sensor pattern 800. This method of electrically coupling each of traces 708, 710, and 712 of sensor pattern 800 independently may involve more than one Application Specific Integrated Circuit (ASIC) if the number of sensing elements is large, whereas the method of interconnecting all sensing elements having the same varying depth and phase, then using intermediate sensing elements 706 to determine the y-position allows a larger number of sensing elements to be used in conjunction with a single ASIC.

Within FIG. 8, the sensor pattern 800 can also be implemented with guard trace 850 at the "top" and guard trace 852 at the "bottom" of sensor pattern 800, thereby enabling the "edge" sensing elements located near them to operate in a manner similar to those sensing elements more centrally located within the sensor pattern 800. The guard traces 850 and 852 may be electrically driven, grounded and/or held at a substantially fixed or constant potential in accordance with embodiments of the present invention.

For example, guard traces 850 and 852 of FIG. 8 may be coupled to ground via traces 854 and 856, respectively; in this manner, guard traces 850 and 852 are functioning as grounded traces. Alternatively, guard traces 850 and 852 may be coupled to a constant potential signal via traces 854 and 856, respectively; in this manner, guard traces 850 and 852 are functioning as constant potential traces. Guard traces 850 and 852 may also be actively driven via traces 854 and 856, respectively; in this manner, guard traces 850 and 852 are functioning as driven guard traces. It is understood that guard traces 850 and 852 may be implemented in a wide variety of ways.

Noted that one or more guard traces (or grounded or fixed potential traces) similar to guard traces 850 and 852 can also be included as part of or with any sensing pattern described herein.

Although sensor pattern 800 of FIG. 8 indicates using repeated sets of three sensing elements to determine the x-position (e.g., first axis) of an object relative to sensor pattern 800, it should be understood that a different number of sensing elements may be employed, using an appropriate mathematical relationship, to discern the x-position of an object.

Figure 9:
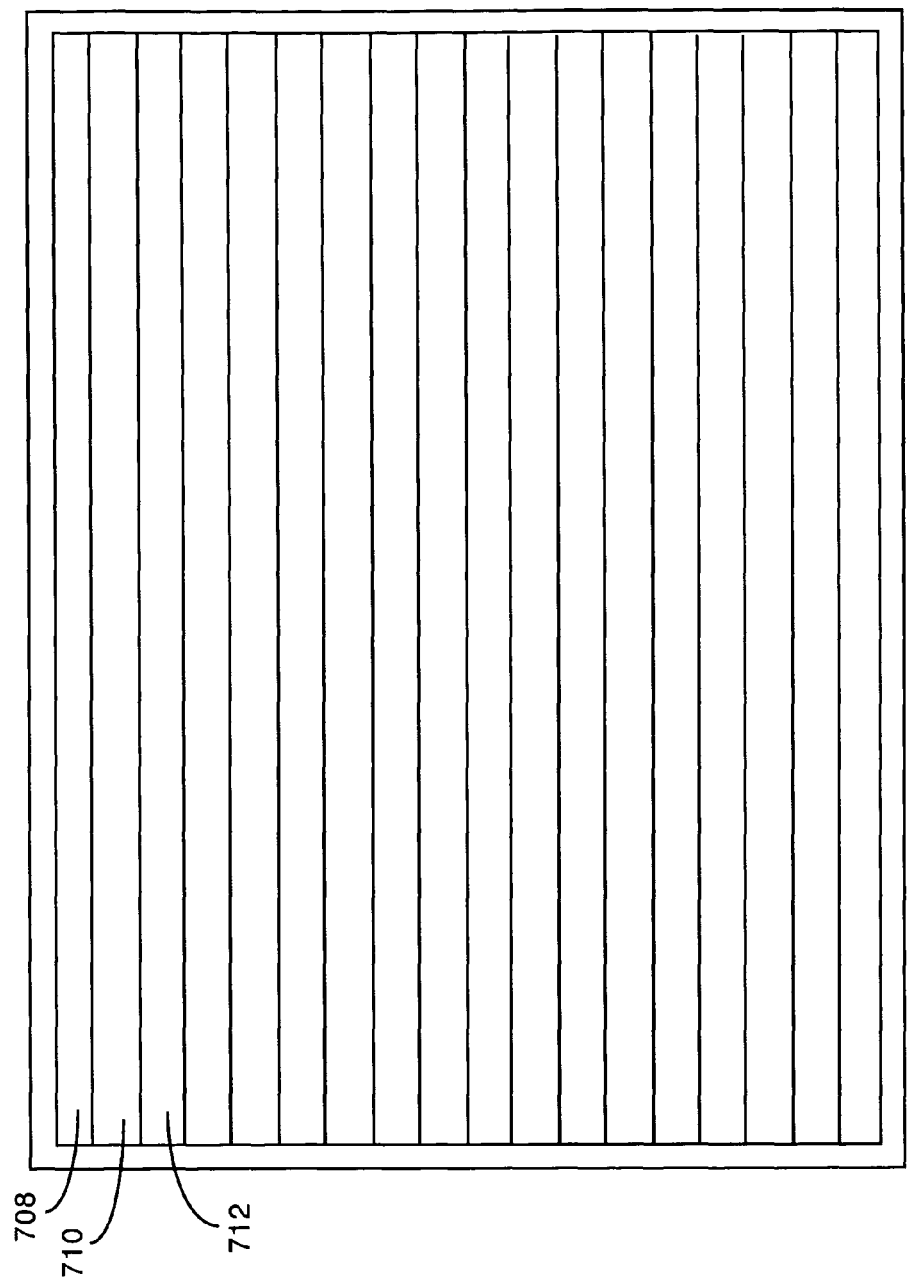
FIG. 9 is a plan view of an exemplary sensor pattern in accordance with embodiments of the invention.

FIG. 9 is a plan view of an exemplary sensor pattern 900 in accordance with embodiments of the invention. Sensor pattern 900 includes six repeated patterns of sensing elements 708, 710, and 712. Specifically, sensing elements 708, 710, and 712 can each have varying depth (or distance) from the sensing reference surface (not shown). The sensing elements 708, 710, and 712 can include waveforms having three phases. Sensing elements 708, 710, and 712 can be utilized as part of a single layer capacitive sensor apparatus (e.g., 100), such as but not limited to, a touchpad. When electrically coupled, sensor pattern 900 can provide two-dimensional positioning information that has substantially parallel traces (or sensing elements) with no crossovers. The sensor pattern 900 can be utilized in any manner similar to that described herein, but is not limited to such.

It is noted that the six repeated patterns of sensing elements 708, 710, and 712 can operate in any manner similar to sensing elements 708, 710, and 712 of sensor pattern 800 of FIG. 8, described herein.

FIGS. 10A and 10B are side sectional views of an exemplary capacitive sensor pattern 1000 in accordance with embodiments of the invention. Specifically, sensor pattern 1000 includes sensing elements 1020 and 1022 which can be utilized as part of a capacitive sensor apparatus (e.g., 100) such as, but not limited to, a touchpad. When electrically coupled to sensing circuitry (e.g., 110), sensor pattern 1000 provides positioning information which can be derived from which sensing element detects an object (e.g., a user's finger, a probe, and the like), and the proportional strength of the signals on sensing elements 1020 and 1022.

Each of sensing elements 1020 and 1022 can have a substantially constant width along its length and is configured to have varying capacitive coupling to an object proximate to a capacitive sensing reference surface 1002 along a first axis (e.g., X axis) of the reference surface 1002. Specifically, the capacitive coupling of sensing element 1020 can vary with variations in dielectric constant between the capacitive sensing reference surface 1002 and portions of sensing element 1020. Furthermore, the capacitive coupling of sensing element 1022 can vary with variations in dielectric constant between the capacitive sensing reference surface 1002 and portions of sensing element 1022. It is appreciated that the variations in the dielectric constant for sensing element 1020 can be different from the variations in the dielectric constant for sensing element 1022. Therefore, sensing elements 1020 and 1022 can each have a substantially constant depth (or distance) from the sensing reference surface 1002, while each can be configured to have varying capacitive coupling to an object proximate to sensing reference surface 1002.

Within FIGS. 10A and 10B, the length of each of sensing elements 1020 and 1022 can be oriented along the first axis. The sensing elements 1020 and 1022 can be conductive, and are configured to provide information corresponding to a spatial location of the object relative to the first axis of the capacitive sensing reference surface 1002. Note that sensing elements 1020 and 1022 can separately provide the information corresponding to a spatial location of the object.

Each of sensing elements 1020 and 1022 can include a strip of conductive material that is substantially straight along the first axis. Specifically, within FIG. 10A, sensing element 1020 is disposed above a substrate 1008, while a dielectric material 1006 is disposed above sensing element 1020, and a dielectric material 1004 is disposed above dielectric material 1006. Note that the upper surface of dielectric material 1006 increasingly slopes away from capacitive sensing reference surface 1002. Given that dielectric material 1004 has a lower dielectric constant than dielectric material 1006 and sensing element 1020 is coupled to sensing circuitry (e.g., 110), sensing element 1020 can have a stronger capacitive coupling to an object proximate to the left-hand side of capacitive sensing reference surface 1002 than when proximate to its right-hand side. Therefore, when sensing element 1020 is coupled with sensing circuitry (e.g., 110), it can have varying capacitive coupling to an object proximate to the sensing reference surface 1002 as the object moves along the length of sensing element 1020. As such, a different signal strength is provided by sensing element 1020 that is associated with each position or location along its length.

Within FIG. 10B, sensing element 1022 is disposed above substrate 1008, while a dielectric material 1010 is disposed above sensing element 1022, and a dielectric material 1012 is disposed above dielectric material 1010. Note that the upper surface of dielectric material 1010 increasingly slopes away from capacitive sensing reference surface 1002. Given that dielectric material 1010 has a lower dielectric constant than dielectric material 1012 and sensing element 1022 is coupled to sensing circuitry (e.g., 110), sensing element 1022 can have a stronger capacitive coupling to an object proximate to the left-hand side of capacitive sensing reference surface 1002 than when proximate to its right-hand side. Therefore, when sensing element 1022 is coupled with sensing circuitry (e.g., 110), it can have varying capacitive coupling to an object proximate to the sensing reference surface 1002 as the object moves along the length of sensing element 1022. As such, a different signal strength is provided by sensing element 1022 that is associated with each position or location along its length.

Within FIGS. 10A and 10B, note that dielectric materials 1004, 1006, 1010, and 1012 can be implemented with differing dielectric constants. As such, when sensing elements 1020 and 1022 are coupled to sensing circuitry (e.g., 110), the proportional strength signals provided by them can be unique as an object proximately located to sensing reference surface 1002 travels along the length of sensing elements 1020 and 1022. Therefore, the sensing circuitry can identify the spatial location of the object relative to the first axis of the capacitive sensing reference surface 1002.

Figure 11:
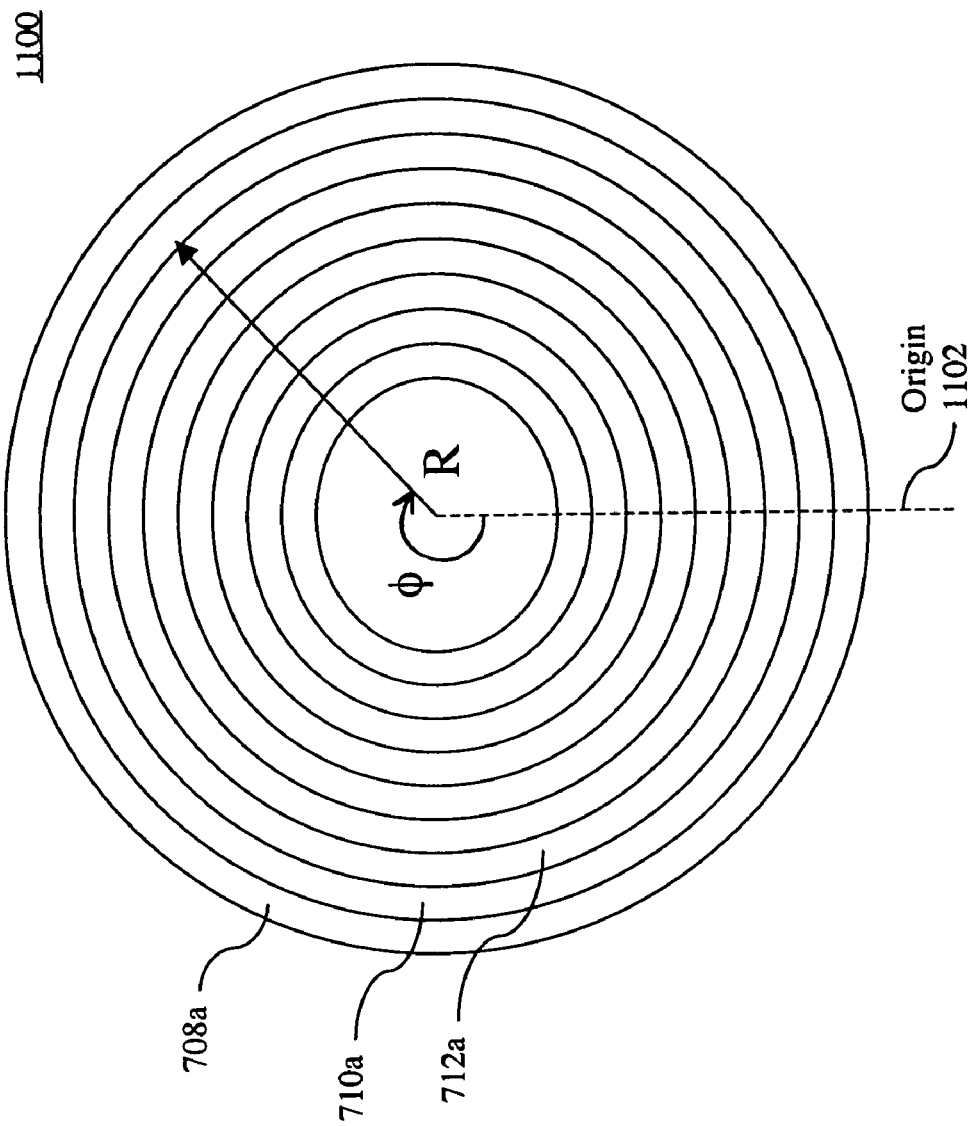
FIG. 11 is a plan view of an exemplary loop capacitive sensor pattern in accordance with embodiments of the invention.

FIG. 11 is a plan view of an exemplary loop capacitive sensor pattern 1100 in accordance with embodiments of the invention. Specifically, sensor pattern 1100 includes three sets of concentric loop patterns of sensing elements 708a, 710a, and 712a that can include waveforms having three phases. The sensor pattern 1100 can be utilized as part of a single layer capacitive sensor apparatus (e.g., 100), such as but not limited to, a touch pad. When electrically coupled, sensor pattern 1100 can provide continuous two-dimensional positioning information that has sensing elements with varying depth and no crossovers. The sensor pattern 1100 can be utilized in any manner similar to that described herein, but is not limited to such.

Specifically, each of the sensing elements 708a, 710a, and 712a has varying depth (or distance) from the sensing reference surface (not shown) and form a substantially circular (or loop) pattern. Noted that a loop pattern may include any closed loop sensor pattern shape (e.g., circle, square, rectangle, triangle, polygon, radial arc sensor pattern, curve, a semi-circle sensor pattern, and/or any sensor pattern that is not substantially in a straight line or in a non-linear manner). The sensing elements 708a, 710a, and 712a are not required to overlap each other in order to determine an angular position φ of an object relative to the substantially circular pattern (e.g., loop) in a two-dimensional space. It is noted that the angular position φ starts at an origin 1102 which can be located anywhere associated with sensor pattern 1100. The sensing elements 708a, 710a, and 712a can provide a cumulative output signal that is substantially constant at different locations along the sensing elements 708a, 710a, and 712a.

Within FIG. 11, the sensing elements 708a, 710a, and 712a can each include a conductive trace. Furthermore, each set of sensing elements (e.g., 708a, 710a, and 712a) can be used for determining a radial position "R" of the object relative to the loop in the two-dimensional space.

Each of the sensing elements (e.g., 708a, 710a, and 712a) of the sensor pattern 1100 can be individually coupled with sensing circuitry (e.g., 110) utilizing conductive coupling traces (e.g., 104 and/or 106). When coupled in this manner, the sensor pattern 1100 can be utilized to form a sensing region (e.g., 108). Furthermore, when coupled in this manner, sensor pattern 1100 can provide positioning information along the angular position φ and the radial position "R".

Alternatively, all similar sensing elements (e.g., 712a) of sensor pattern 1100 can be coupled together as shown in FIG. 8 and coupled with sensing circuitry (e.g., 110) utilizing a conductive coupling trace (e.g., 104 or 106). When coupled in this manner, the sensor pattern 1100 can provide positioning information to the sensing circuitry corresponding to the angular position φ, but not of the radial position "R". It is understood that the radial position "R" can be determined in any manner similar to the way the second axis position can be determined, as described herein.

Sensor pattern 1100 can be implemented with a greater or lesser number of sensing elements than shown within the present embodiment. For example, sensor pattern 1100 can be implemented with a single set of sensing elements 708a, 710a, and 712a. Alternatively, sensor pattern 1100 can be implemented with multiple sets of sensing elements 708a, 710a, and 712a. Sensor pattern 1100 and its sensing elements can be implemented in any manner similar to that described herein, but is not limited to such.

Within FIG. 11, each set of the sensing elements (e.g., 708a, 710a, and 712a) of sensor pattern 1100 can operate in any manner similar to that described herein in order to provide the positioning information corresponding to the angular position φ of an object (e.g., a user's finger, a probe, a stylus, and the like) in relation to sensor pattern 1100. The sensing elements 708a, 710a, and 712a can be configured to provide information corresponding to a spatial location of the object proximate to a curve on said capacitive sensing reference surface (not shown). For example, each set of the signals associated with a set of sensing elements (e.g., 708a, 710a, and 712a) can be utilized to determine the phase angle θ, in a manner similar to that described herein with reference to FIG. 6. Noted that once the phase angle θ has been determined, it may be converted into a geometric position angle φ relative to the origin 1102. In this manner, the angular position φ of an object is determined relative to sensor pattern 1100.

Figure 12:
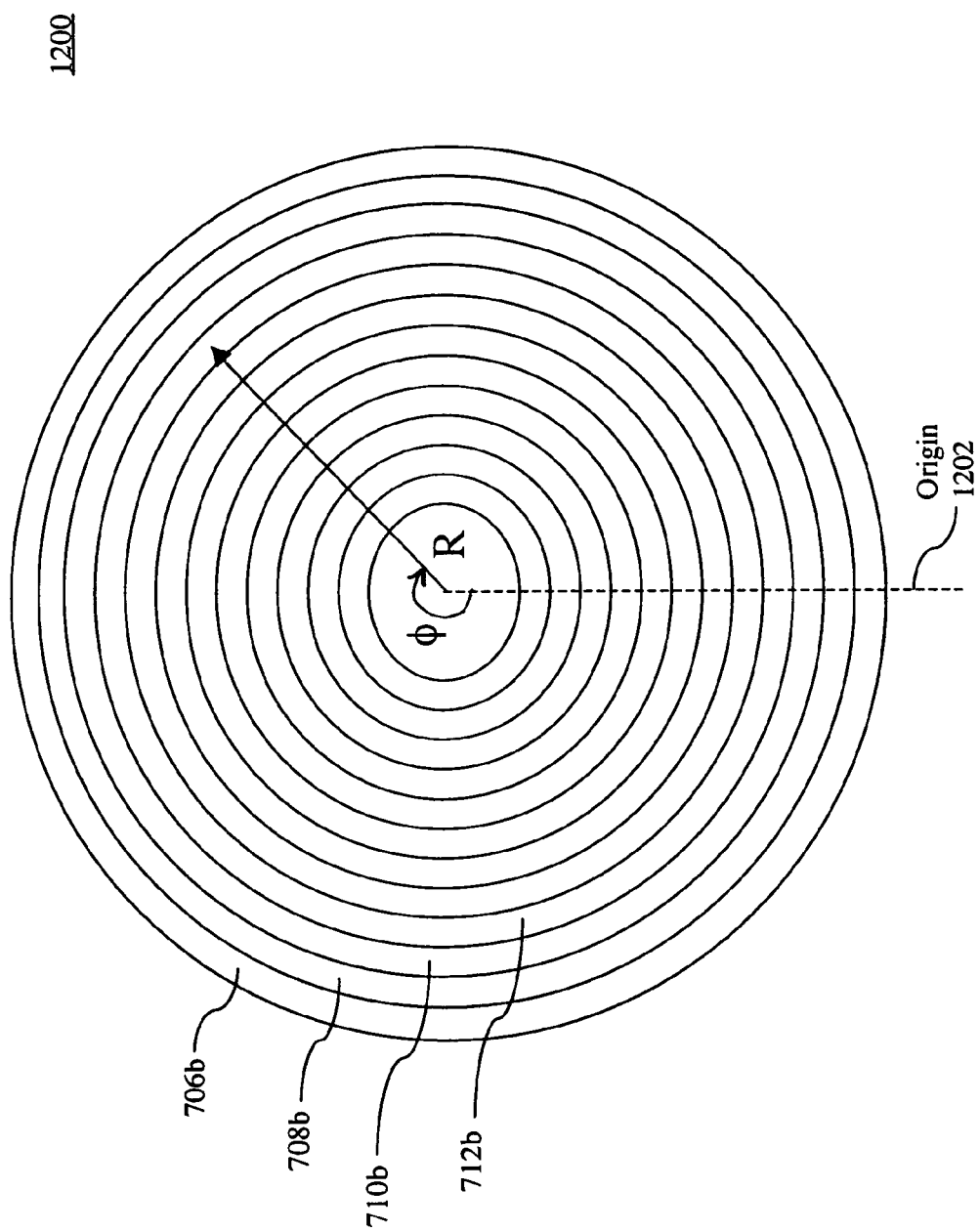
FIG. 12 is a plan view of an exemplary loop capacitive sensor pattern in accordance with embodiments of the invention.

FIG. 12 illustrates an exemplary loop capacitive sensor pattern 1200 in accordance with embodiments of the present invention. Specifically, sensor pattern 1200 includes three sets of concentric loop patterns of sensing elements 706b, 708b, 710b, and 712b. Note that sensing elements 708b, 710b, and 712b can each have varying depth (or distance) from the sensing reference surface (not shown) while sensing element 706b can have a substantially constant depth from the reference surface. The sensing elements 708b, 710b, and 712b can include waveforms having three phases. Sensor pattern 1200 can be utilized as part of a single layer capacitive sensor apparatus (e.g., 100), such as, but not limited to, a touch pad. When electrically coupled, sensor pattern 1200 can provide continuous two-dimensional positioning information that has sensing elements with varying depth and no crossovers. The sensor pattern 1200 can be utilized in any manner similar to that described herein, but is not limited to such.

Specifically, sensing elements 706b, 708b, 710b, and 712b form a substantially circular (or loop) pattern. Noted that a loop pattern may include any closed loop sensor pattern shape (e.g., circle, square, rectangle, triangle, polygon, radial arc sensor pattern, a semi-circle sensor pattern, and/or any sensor pattern that is not substantially in a straight line). The sensing elements 706b, 708b, 710b, and 712b are not required to overlap each other in order to determine an angular position φ and radial position "R" of an object relative to the substantially circular pattern (e.g., loop) in a two-dimensional space. The angular position φ starts at an origin 1202 which can be located anywhere associated with sensor pattern 1200. The sensing elements 708b, 710b, and 712b provide a cumulative output signal that can be substantially constant at different locations along the sensing elements 708b, 710b, and 712b.

Within FIG. 12, the sensing elements 706b, 708b, 710b, and 712b can each include a conductive trace. Similar varying depth sensing elements (e.g., 708b) of sensor pattern 1200 can be coupled together as shown in FIG. 8 and coupled with sensing circuitry (e.g., 110) utilizing a conductive coupling trace (e.g., 104 or 106). When coupled in this manner, the sensor pattern 1200 can provide positioning information to the sensing circuitry corresponding to the angular position φ, but not of the radial position "R". It is understood that the radial position "R" can be determined from sensors 706b in any manner similar to the way the second axis position can be determined, as described herein.

Sensor pattern 1200 can be implemented with a greater or lesser number of sensing elements than shown within the present embodiment. For example, sensor pattern 1200 can be implemented with a single set of sensing elements 706b, 708b, 710b, and 712b. Alternatively, sensor pattern 1200 can be implemented with multiple sets of sensing elements 706b, 708b, 710b, and 712b. Sensor pattern 1200 and its sensing elements can be implemented in any manner similar to that described herein, but is not limited to such.

Within FIG. 12, each set of the varying depth sensing elements 706b, 708b, 710b, and 712b of sensor pattern 1200 can operate in any manner similar to that described herein in order to provide the positioning information corresponding to the angular position φ of an object (e.g., a user's finger, a probe, a stylus, and the like) in relation to sensor pattern 1200. For example, each set of the signals associated with the set of varying depth sensing elements 708b, 710b, and 712b can be utilized to determine the phase angle θ, in a manner similar to that described herein with reference to FIG. 6. Noted that once the phase angle θ has been determined, it may be converted into a geometric position angle φ relative to the origin 1202. In this manner, the angular position φ of an object is determined relative to sensor pattern 1200.

Figure 13:
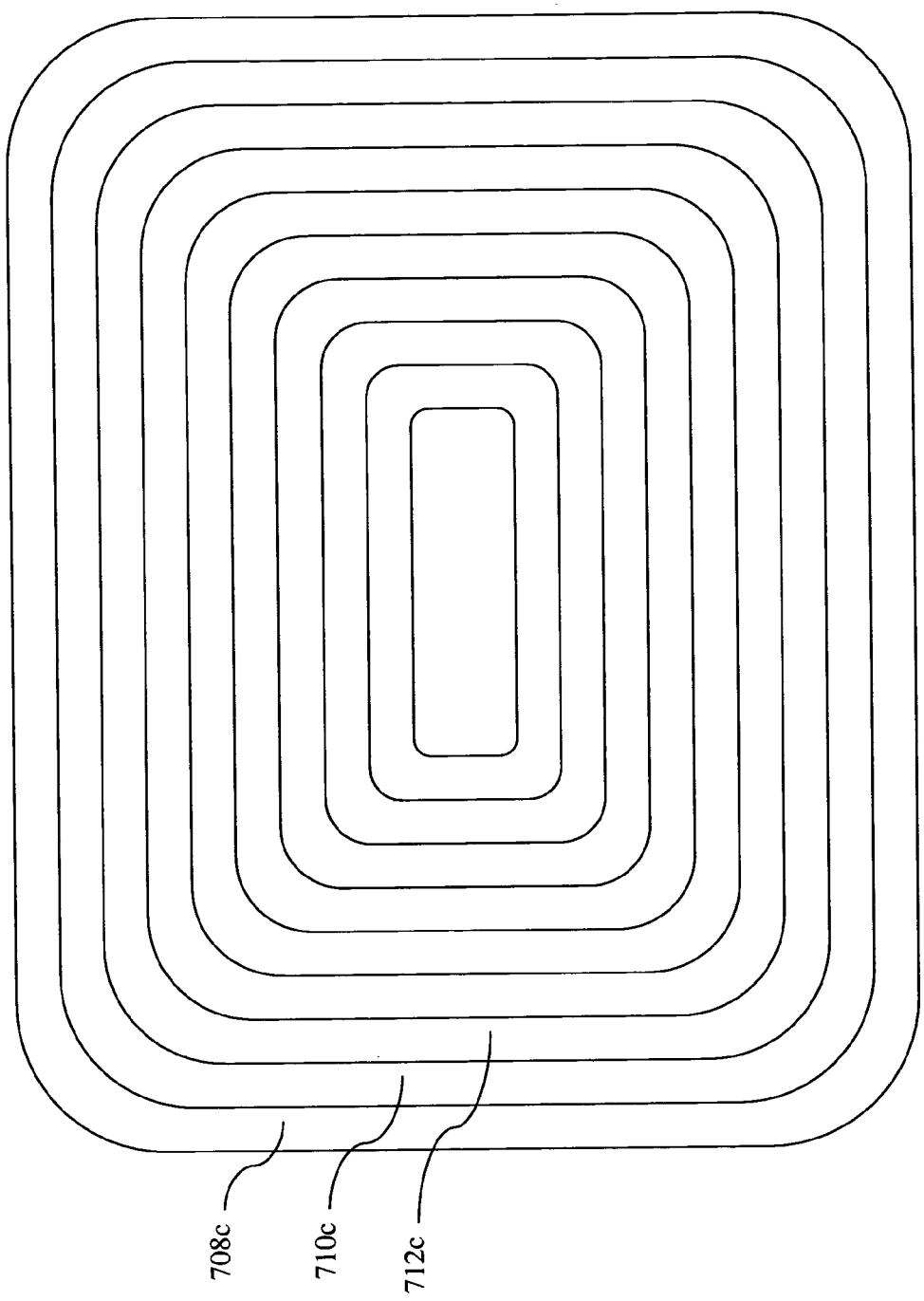
FIG. 13 is a plan view of an exemplary loop capacitive sensor pattern in accordance with embodiments of the invention.

FIG. 13 is a plan view of an exemplary loop capacitive sensor pattern 1300 in accordance with embodiments of the invention. Specifically, sensor pattern 1300 includes three sets of concentric loop patterns of sensing elements 708c, 710c and 712c. Note that sensing elements 708c, 710c, and 712c can each have varying depth or distance from the reference surface (not shown). The sensing elements 708c, 710c, and 712c can be implemented to include waveforms having three phases. The sensing elements 708c, 710c, and 712c can be utilized as part of a single layer capacitive sensor apparatus (e.g., 100), such as but not limited to, a touchpad. When electrically coupled, sensor pattern 1300 can provide continuous two-dimensional positioning information that has sensing elements with varying depth and no crossovers. The sensor pattern 1300 can be utilized in any manner similar to that described herein, but is not limited to such.

Note that sensor pattern 1300 can operate in any manner similar to sensor pattern 1100 of FIG. 11. The sensor pattern 1300 can be implemented with a greater or lesser number of sensing elements than shown within the present embodiment. Sensor pattern 1300 and its sensing elements can be implemented in any manner similar to that described herein, but is not limited to such.

Figure 14:
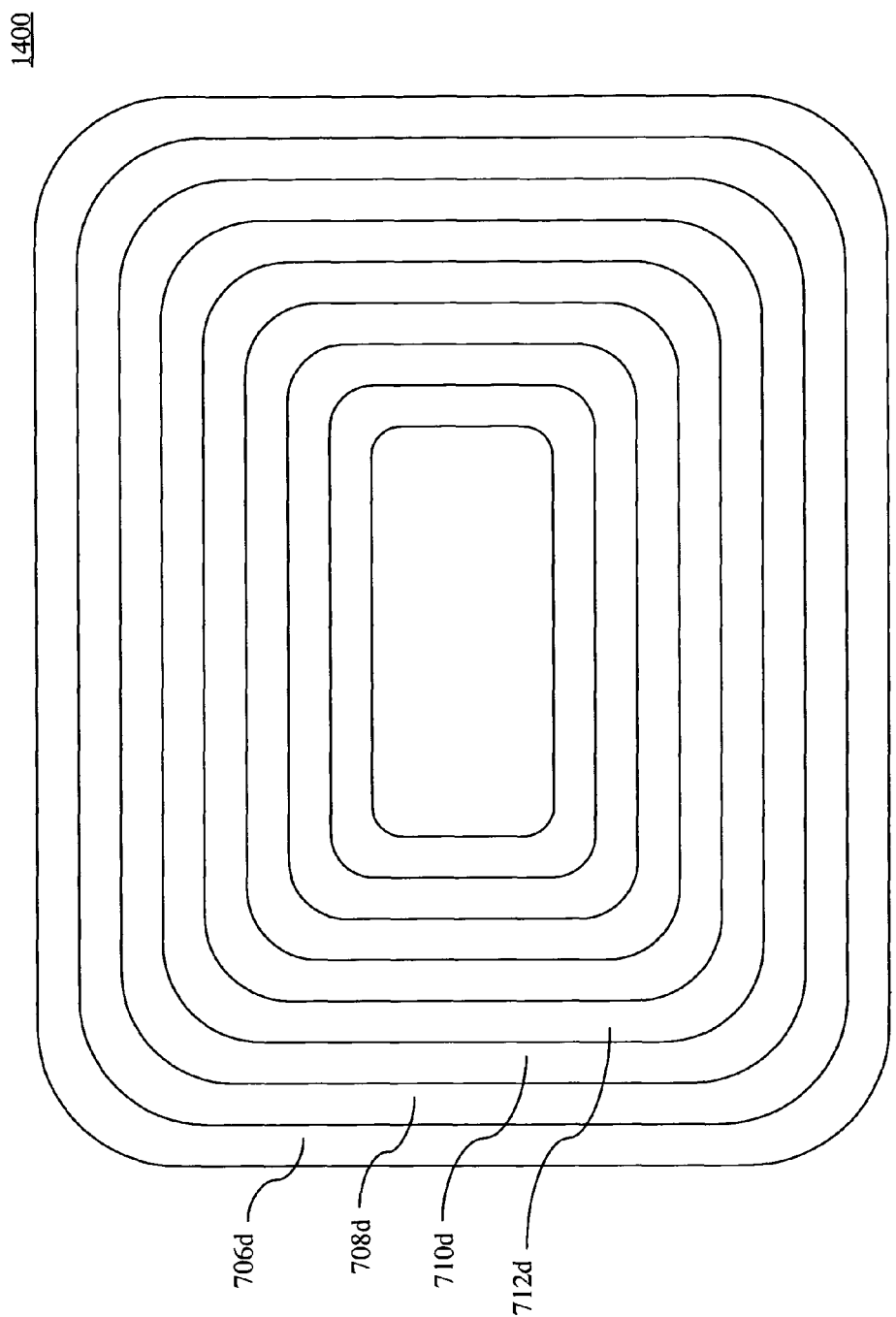
FIG. 14 is a plan view of an exemplary loop capacitive sensor pattern in accordance with embodiments of the invention.

FIG. 14 is a plan view of an exemplary loop capacitive sensor pattern 1400 in accordance with embodiments of the invention. Specifically, sensor pattern 1400 includes two sets of concentric loop patterns of sensing elements 706d, 708d, 710d, and 712d. Note that sensing elements 708d, 710d, and 712d can each have varying depth or distance from the reference surface (not shown) while sensing element 706d can have a substantially constant depth or distance from the reference surface. The sensing elements 708d, 710d, and 712d can be implemented to include waveforms in three phases. The sensing elements 706d, 708d, 710d, and 712d can be utilized as part of a capacitive sensor apparatus (e.g., 100), such as but not limited to, a touchpad. When electrically coupled, sensor pattern 1400 can provide continuous two-dimensional positioning information that has sensing elements with varying depth and no crossovers. The sensor pattern 1400 can be utilized in any manner similar to that described herein, but is not limited to such.

It is appreciated that sensor pattern 1400 can operate in any manner similar to sensor patterns 1100 (FIG. 11) and/or 1200 (FIG. 12). The sensor pattern 1400 can be implemented with a greater or lesser number of sensing elements than shown within the present embodiment. Sensor pattern 1400 and its sensing elements can be implemented in any manner similar to that described herein, but is not limited to such.

Figure 15:
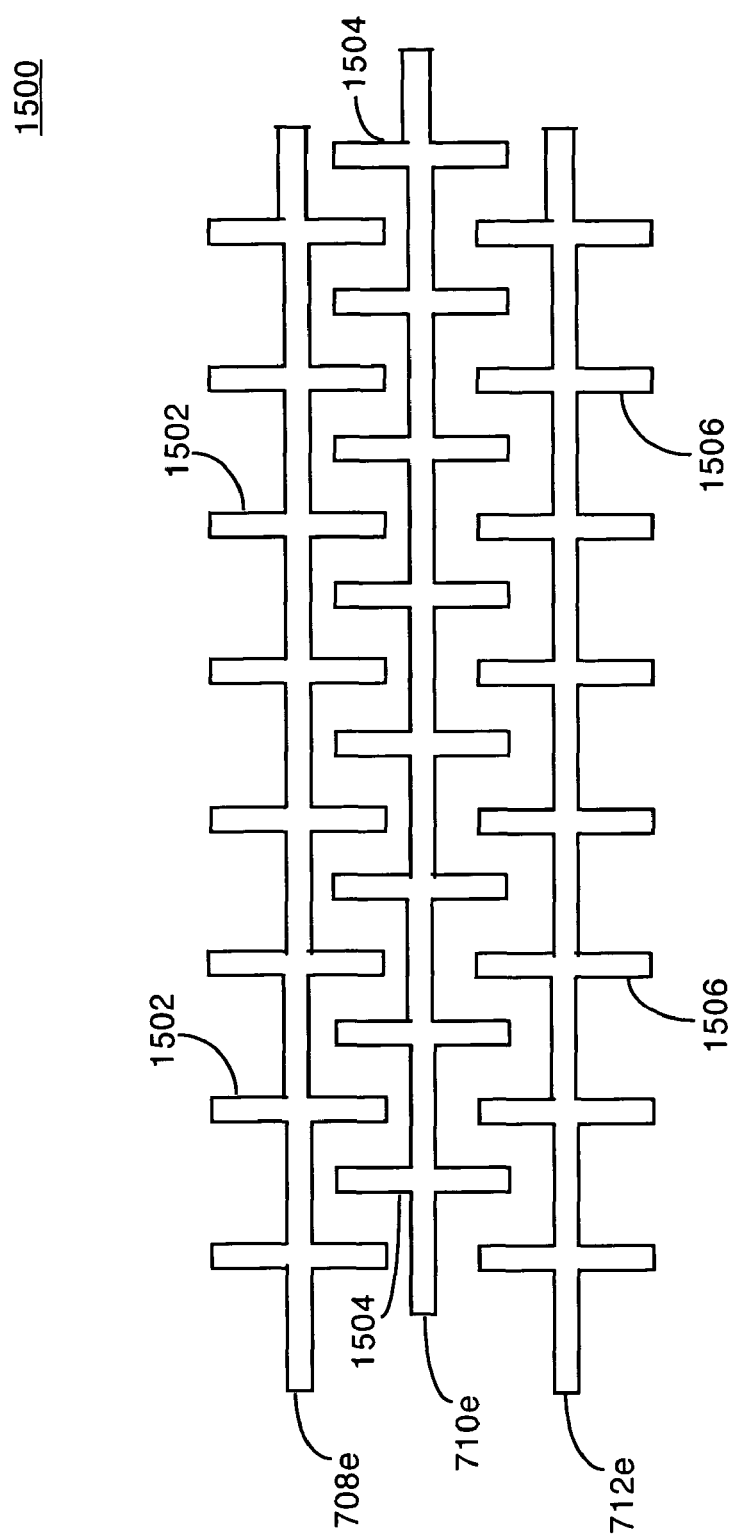
FIG. 15 is a plan view of an exemplary "fishbone" capacitive sensor pattern in accordance with embodiments of the invention.

FIG. 15 is a plan view of an exemplary "fishbone" capacitive sensor pattern 1500 in accordance with embodiments of the invention. Specifically, sensor pattern 1500 includes a set of sensing elements 708e, 710e, and 712e that can be utilized as part of a capacitive sensor apparatus (e.g., 100), such as but not limited to, a touchpad. Note that sensing elements 708e, 710e, and 712e can each have varying depth (or distance) from a sensing reference surface (not shown). When electrically coupled, sensor pattern 1500 can provide two-dimensional positioning information that has substantially parallel traces (or sensing elements) with no crossovers. The sensor pattern 1500 can be utilized in any manner similar to that described herein with reference to FIGS. 7A-7E, 8, and 9, but is not limited to such. Moreover, sensor pattern 1500 can be utilized in any manner similar to that described herein, but is not limited to such.

Specifically, sensing element 708e can include a plurality of extensions 1502 that are substantially parallel to each other and are substantially perpendicular to a first axis of sensing element 708e. The sensing element 710e can include a plurality of extensions 1504 that are substantially parallel to each other and are substantially perpendicular to the first axis of sensing element 710e. The sensing element 712e can include a plurality of extensions 1506 that are substantially parallel to each other and are substantially perpendicular to the first axis of sensing element 712e.

Within FIG. 15, the plurality of extensions 1502 of sensing element 708e can be interdigitated with the plurality of extensions 1504 of sensing element 710e. Moreover, the plurality of extensions 1506 of sensing element 712e can be interdigitated with the plurality of extensions 1504 of sensing element 710e.

Sensing elements 708e, 710e, and 712e can be used for determining a first location of an object (e.g., a user's finger, a probe, a stylus, and the like) in relation to sensor pattern 1500 along the first axis of a two-dimensional space. Furthermore, a repeated set of sensing elements 708e, 710e, and 712e (not shown) can be used for determining first and second locations of an object in relation to sensor pattern 1500 along the first axis and a second axis of the two-dimensional space, wherein the second axis is substantially non-parallel (or substantially perpendicular) to the first axis.

Within FIG. 15, sensor pattern 1500 can operate in any manner similar to sensor patterns 700a-700e of FIGS. 7A-E. Additionally, the sensor pattern 1500 can be implemented with a greater or lesser number of sensing elements than shown within the present embodiment. Sensor pattern 1500 and its sensing elements can be implemented in any manner similar to that described herein, but is not limited to such.

Figure 16:
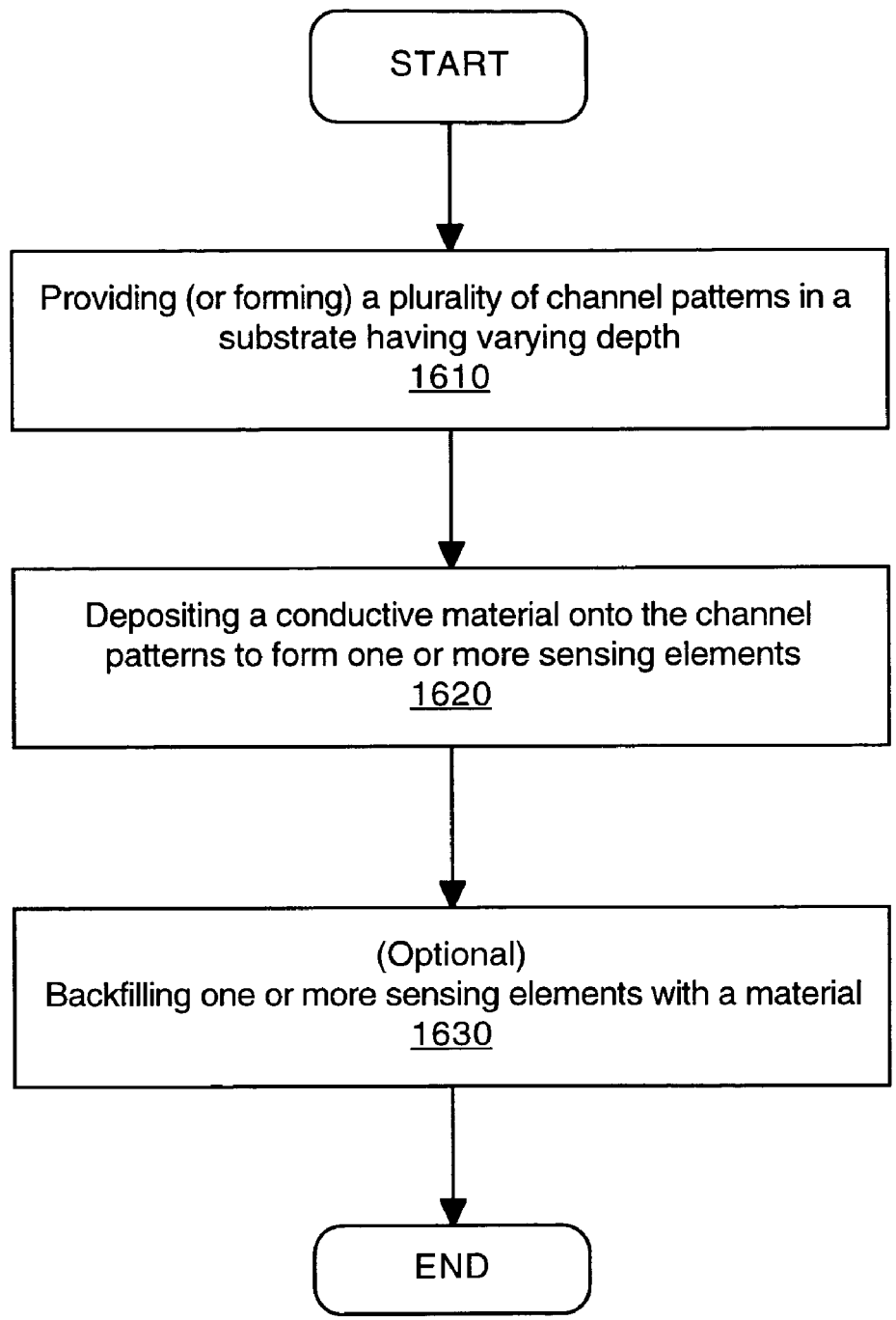
FIG. 16 is a flowchart of a method in accordance with embodiments of the invention.

FIG. 16 is a flowchart of a method 1600 for establishing a position-varying capacitive coupling between a conductive object proximate to a capacitive sensing reference surface and a conductive trace in accordance with embodiments of the invention. Although specific operations are disclosed in method 1600, such operations are exemplary. That is, method 1600 may not include all of the operations illustrated by FIG. 16. Alternatively, method 1600 may include various other operations and/or variations of the operations shown by FIG. 16.

Specifically, a plurality of channel patterns can be provided (or formed) in a substrate. Note that the channel patterns varying in depth. A conductive material can be deposited onto the channel patterns to form a first sensing element and second sensing element. The first sensing element and second sensing element can be conductive and lie substantially along a first orientation. Furthermore, each of the first sensing element and second sensing element can be configured to provide information corresponding to a first location along the first orientation.

At operation 1610 of FIG. 16, a plurality of channel (or groove) patterns having varying depth can be provided (or formed) in a substrate. It is understood that the substrate can be implemented in a wide variety of ways. For example, the substrate can be implemented to include, but is not limited to, a plastic or a crystalline material. Additionally, the substrate can be implemented as a component of an information display device or a portable computing device. For example, the substrate can be implemented as a part of a casing or front cover of an information display device or portable computing device. The channel patterns can include waveforms or portions of waveforms. For example, the channel patterns can include one or more sinusoidal waveforms. Alternatively, the channel patterns can include one or more portions of a sinusoidal waveform.

At operation 1620, a conductive material can be deposited onto the channel (or groove) patterns to form a first sensing element and second sensing element that are conductive and lie substantially along a first orientation. Note that more than two sensing elements can be formed at operation 1620. Each of the first sensing element and second sensing element can be configured to provide information corresponding to a first location along the first orientation. Note that the first orientation can be implemented in diverse ways. For example, the first orientation can be substantially linear. Alternatively, the first orientation can be non-linear. The first and second sensing elements can be implemented in a wide variety of ways. For example, the first sensing element can include a first waveform while the second sensing element can include a second waveform. Additionally, the first waveform and the second waveform can be different or similar. The first waveform and the second waveform can each include one or more sinusoidal waveforms or a portion of a sinusoidal waveform. Moreover, the first waveform and the second waveform can each have a different phase. It is understood that the first sensing element and second sensing element can each form at least a portion of a loop or a curve.

At operation 1630 of FIG. 16, the first sensing element can be backfilled with a material. Note that the second sensing element may also be backfilled with a material at operation 1630. Note that the backfilling material can be implemented in a wide variety of ways. For example, the material can be implemented as, but not limited to, the material of which the substrate is formed, insulating material, and/or electrical shielding material. This optional backfilling material can provide physical protection to the one or more sensing elements. Additionally, the backfilling material can provide electrical shielding thereby causing the one or more sensing elements to measure capacitance on a desired reference sensing surface of the substrate, instead of on both sides of the substrate. Moreover, the backfilling material can provide a smooth back surface on the substrate that may be desirable in some circumstances.

By fabricating the capacitive sensor pattern in the manner shown in FIG. 16, failure rates can be reduced since only one layer of conductive material is utilized, and there are no crossovers in the sensing elements. In addition, the capacitive sensor pattern may be manufactured very inexpensively by molding the channel patterns into the case of a laptop computer or other electronic device and depositing (or printing or spraying) the conductive material onto the channel patterns.

Note that sensor patterns in accordance with embodiments of the invention do not induce signal to noise ratio concerns.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A capacitive sensing device comprising:
a first sensing element having varying depth relative to a capacitive sensing reference surface, said varying depth comprising a waveform;
a second sensing element substantially parallel to said first sensing element, and having varying depth relative to said capacitive sensing reference surface, said varying depth of said second sensing element comprising a waveform that is phase shifted by a value with respect to said waveform of said first sensing element; and
a third sensing element substantially parallel to said first sensing element, and having varying depth relative to said capacitive sensing reference surface, said varying depth of said third sensing element comprising a waveform that is phase shifted by a second value with respect to said waveform of said first sensing element such that said first sensing element, said second sensing element, and said third sensing element comprise waveforms of three differing phases,
wherein said first sensing element, second sensing element, and third sensing element are configured to provide information corresponding to a position of an object proximate to said capacitive sensing reference surface along a first axis of said capacitive sensing reference surface.

2. The capacitive sensing device of claim 1, wherein:
portions of said first sensing element are configured to have a capacitive coupling with respect to said object wherein said capacitive coupling varies along said first axis;
portions of said second sensing element are configured to have a capacitive coupling with respect to said object wherein said capacitive coupling varies along said first axis; and
portions of said third sensing element are configured to have a capacitive coupling with respect to said object wherein said capacitive coupling varies along said first axis.

3. The capacitive sensing device of claim 1, wherein:
said waveform of said second sensing element is phase shifted from said waveform of said first sensing element by one third of a period; and said waveform of said third sensing element is phase shifted from said waveform of said first sensing element by two thirds of a period.

4. The capacitive sensing device of claim 1, wherein said position is determined using a signal corresponding to said first sensing element, a signal corresponding to said second sensing element, and a signal corresponding to said third sensing element.

5. The capacitive sensing device of claim 1, wherein said first sensing element, said second sensing element, and said third sensing element each comprises a conductive trace.

6. The capacitive sensing device of claim 1, wherein at least one of said first sensing element, second sensing element, and third sensing element is used for determining a second position along a second axis substantially perpendicular to said first axis.

7. The capacitive sensing device of claim 1, wherein:
said varying depth of said first sensing element comprises a sinusoidal waveform;
said varying depth of said second element comprises a sinusoidal waveform offset from said sinusoidal waveform of said varying depth of said first sensing element; and
said varying depth of said third sensing element comprises a sinusoidal waveform offset from said sinusoidal waveform of said varying depth of said first sensing element and said sinusoidal waveform of said varying depth of said second sensing element.

8. The capacitive sensing device of claim 1, further comprising:
a fourth sensing element utilized for determining a second position along a second axis that is non-parallel to said first axis.

9. The capacitive sensing device of claim 1, further comprising:
a fourth sensing element having varying depth;
a fifth sensing element having varying depth;
a sixth sensing element having varying depth, wherein said fourth, fifth, and sixth sensing elements are substantially parallel to said first sensing element, and are configured for determining said position along said first axis.

10. The capacitive sensing device of claim 1, wherein said first, second, and third sensing elements are utilized as part of a capacitive touch pad device.

11. The capacitive sensing device of claim 4, wherein said position is determined using a trigonometric function.

12. The capacitive sensing device of claim 5, wherein each said conductive trace is disposed above a substrate, wherein a side of said substrate comprises channels of varying depths, said varying depths defining a unique depth profile for each of said first, second, and third sensing elements.

13. The capacitive sensing device of claim 9, wherein at least one of said first, second, third, fourth, fifth, and sixth sensing elements is configured for determining a second position along a second axis, said second axis not parallel to said first axis.

14. A portable electronic device comprising:
a capacitive sensor;
a processor coupled with said capacitive sensor, wherein said capacitive sensor comprises:
a first sensing element having varying depth comprising a sine ($\theta$) waveform;
a second sensing element having varying depth comprising a sine ($\theta$) waveform having an offset substantially $2\pi/3$ radians from said sine ($\theta$) waveform of said first sensing element; and
a third sensing element having varying depth comprising a sine ($\theta$) waveform having an offset substantially $4\pi/3$ radians from said sine ($\theta$) waveform of said first sensing element, wherein said first sensing element, second sensing element, and third sensing element are each conductive and substantially parallel to a first axis, wherein said first sensing element, second sensing element and third sensing element are configured to provide information corresponding to a first position along said first axis.

15. The portable electronic device of claim 14, wherein at least one of said first sensing element, second sensing element, and third sensing element is used for determining a second position along a second axis not parallel to said first axis.

16. The portable electronic device of claim 14, wherein said first location along said first axis is determined using signals from said first sensing element, said second sensing element, and said third sensing element.

17. The portable electronic device of claim 14, wherein said first location along said first axis is determined using a trigonometric function.

18. The portable electronic device of claim 14, further comprising:
a fourth sensing element utilized to determine a second location along a second axis that is substantially perpendicular to said first axis.

19. A method for establishing a position-varying capacitive coupling between a conductive object proximate to a capacitive sensing reference surface and a conductive trace, said method comprising:
providing a plurality of channel patterns in a substrate, said channel patterns varying in depth; and
depositing a conductive material onto said channel patterns to form a first sensing element, a second sensing element and a third sensing element, wherein said first sensing element, said second sensing element, and said third sensing element are conductive and lie substantially along a first orientation such that said first sensing element comprises a waveform that is substantially sin ($\theta$), said second sensing element comprises a waveform that is substantially sin($\theta$+120 degrees), and said third sensing element comprises a waveform that is substantially sin($\theta$+240 degrees), and each of said first sensing element, said second sensing element, and said third sensing element is configured to provide information corresponding to a first location along said first orientation.

20. The method as recited in claim 19, wherein said first orientation is substantially linear.

21. The method as recited in claim 19, wherein said first orientation is non-linear.

22. The method as recited in claim 19, further comprising:
backfilling said first sensing element with a material.

23. The method as recited in claim 19, wherein said first sensing element and said second sensing element each forms at least a portion of a loop.

* * * * *